United States Patent [19]

Swinehart et al.

[11] Patent Number: 4,914,586

[45] Date of Patent: Apr. 3, 1990

[54] GARBAGE COLLECTOR FOR HYPERMEDIA SYSTEMS

[75] Inventors: Daniel C. Swinehart, Palo Alto; Douglas B. Terry, San Carlos, both of Calif.

[73] Assignee: Xerox Corporation, Stamford, Conn.

[21] Appl. No.: 118,493

[22] Filed: Nov. 6, 1987

[51] Int. Cl.⁴ .................. G06F 12/00; G06F 15/62
[52] U.S. Cl. .................. 364/200; 364/222.82; 364/225.6; 364/281.1; 364/282.2
[58] Field of Search ... 364/200 MS File, 900 MS File

[56] References Cited

U.S. PATENT DOCUMENTS

| | | | |
|---|---|---|---|
| 3,534,338 | 10/1970 | Christensen et al. | 364/200 |
| 4,084,231 | 4/1978 | Capozzi et al. | 364/200 |
| 4,390,945 | 6/1983 | Olsen et al. | 364/200 |
| 4,479,196 | 10/1984 | Ferrer et al. | 364/900 |
| 4,611,298 | 9/1986 | Schuldt | 364/900 |
| 4,716,524 | 12/1987 | Oxley et al. | 364/200 |
| 4,809,170 | 2/1989 | Leblang et al. | 364/200 |
| 4,814,971 | 3/1989 | Thatte | 364/200 |

OTHER PUBLICATIONS

Ades, S., and Swinehart, D. C., "Voice Annotation and Editing in a Workstation Environment," *Proceedings AVIOS Voice Applications*, '86, Sep. 1986, pp. 13-28.
Bayer, R., and McCreight, E., "Organization and Maintenance of Large Ordered Indexes," *Acta Informatica*, 1(3), 1972, pp. 173-189.
Birrell, A., Levin, R., Needham, R. M., and Schroeder, M. D., "Grapevine: An Exercise in Distributed Computing," *Communications of the ACM*, 25(4), Apr. 1982, pp. 260-274.
Birrell, A. D., and Nelson, B. J., "Implementing Remote Procedure Calls," *ACM Transactions on Computer Systems*, 2(1), Feb. 1984, pp. 39-59.
Birrell, A. D., "Secure Communication Using Remote Procedure Calls," *ACM Transactions on Computer Systems*, 3(1), Feb. 1985, pp. 1-14.
Brown, M. R., Kolling, K., and Taft, E. A., "The Alpine File System," *ACM Transactions on Computer Systems*, 3(4), Nov. 1985, pp. 261-293.
Clark, D. D., "The Structuring of Systems Using Upcalls," *Proceedings Tenth Symposium on Operating Systems Principles*, Orcas Island, Wash., Dec. 1985, pp. 171-180.
Donahue, J., and Orr, W.-S., "Walnut: Storing Electronic Mail in a Database," *Xerox Palo Alto Research Center, Technical Report CSL-85-9*, Nov. 1985.
Gould, J. D., and Boies, S. J., "Speech Filing—An Office System for Principals," *IBM Systems Journal*, 23(1), Jan. 1984, pp. 65-81.
Gray, J. N., "Notes on Database Operating Systems," Bayer et al., *Operating Systems: An Advanced Course*, Springer-Verlag, 1978, pp. 393-481.
Lampson, B. W., and Pier, K. A., "A Processor for a High-Performance Personal Computer," *Proceedings 7th Symposium on Computer Architecture*, La Baule, May 1980, pp. 146-160.

(List continued on next page.)

*Primary Examiner*—Raulfe B. Zache
*Assistant Examiner*—Florin Munteanu

[57] ABSTRACT

A database of interests is maintained in a distributed computing system to register the individual interests of users in centrally stored non-textual media files, such as digital voice, music, scanned-in image, and video files. Uniquely named piece table style persistent data structures are employed to give users controlled access to the underlying non-textual media files by embedded name reference to such piece tables in ordinary messages or text files, so a database of piece tables is also maintained. A garbage collector periodically enumerates the interest database to delete interest entries which have been invalidated. Aged piece tables are deleted from the reference database when there no longer are any recorded interests referring to them, and non-textual media files are deleted to reclaim the storage space allocated to them when there no longer are any piece tables referring to them.

1 Claim, 5 Drawing Sheets

OTHER PUBLICATIONS

Lampson, B. W., "Hints for Computer System Design," *Proceedings Ninth Symposium on Operating Systems Principles,* Bretton Woods, N.H., Oct. 1983, pp. 33-48.

Liskov, B. and Ladin, R., "Highly-Available Distributed Services and Fault-Tolerant Distributed Garbage Collection," *Proceedings of Symposium on Principles of Distributed Computing,* Calgary, Alberta, Canada, Aug. 1986, pp. 29-39.

Maxemchuk, N., "An Experimental Speech Storage and Editing Facility," *Bell System Technical Journal,* 59(8), Oct. 1980, pp. 1383-1395.

Mitchell, J. G., and Dion, J., "A Comparison of Two Network-Based File Serves," *Communications of the ACM,* 25(4), Apr. 1982, pp. 233-245.

National Bureau of Standards, "Data Encryption Standard," *Federal Information Processing Standard (FIPS),* Publication 46, U.S. Department of Commerce, Jan. 1977.

Nicholson, R., "Integrating Voice in the Office World," BYTE, 8(12), Dec. 1983, pp. 177-184.

Reynolds, J. K., Postel, J. B., Katz, A. R., Finn, G. G., and DeSchon, A. L., "The DARPA Experimental Multimedia Mail System," *Computer,* 18(10), Oct. 1985, pp. 82-89.

Ruiz, A., "Voice and Telephony Applications for the Office Workstation," *Proceedings 1st International Conference on Computer Workstations,* San Jose, Calif., Nov. 1985, pp. 158-163.

Svobodova, L., "A Reliable Object-Oriented Data Repository for a Distributed Computer System," *Proceedings Eighth Symposium on Operating Systems Principles,* Pacific Grove, Calif., Dec. 1981, pp. 47-58.

Svobodova, L., "File Servers for Network-Based Distributed Systems," *ACM Computing Surveys,* 16(4), Dec. 1984, pp. 353-398.

Swinehart, D. C., Stewart, L. C., and Ornstein, S. M., "Adding Voice to an Office Computer Network," *Xerox Palo Alto Research Center Technical Report CSL-83-8,* Feb. 1984.

Swinehart, D. C., Zellweger, P. T., Beach, R. J., and Hagmann, R. B., "A Structural View of the Cedar Programming Environment," *Xerox Palo Alto Research Center Technical Report CSL-86-1,* Jun. 1986.

Swinehart, D. C., Terry, D. B., and Zellweger, P. T., "An Experimental Environment for Voice System Development," *IEEE Office Knowledge Engineering Newsletter,* Feb. 1987.

Thomas, R. H., Forsdick, H. C., Crowley, T. R., Schaaf, R. W., Tomlinsin, R. S., Travers, V. M., and Robertson, G. G., "Diamond: A Multimedia Message System Built on a Distributed Architecture," *Computer,* 18(12), Dec. 1985, pp. 65-78.

Yankelovich, N., Meyrowitz, N., and van Dam, A., "Reading and Writing the Electronic Book," *Computer,* 18(10), Oct. 1985, pp. 15-30.

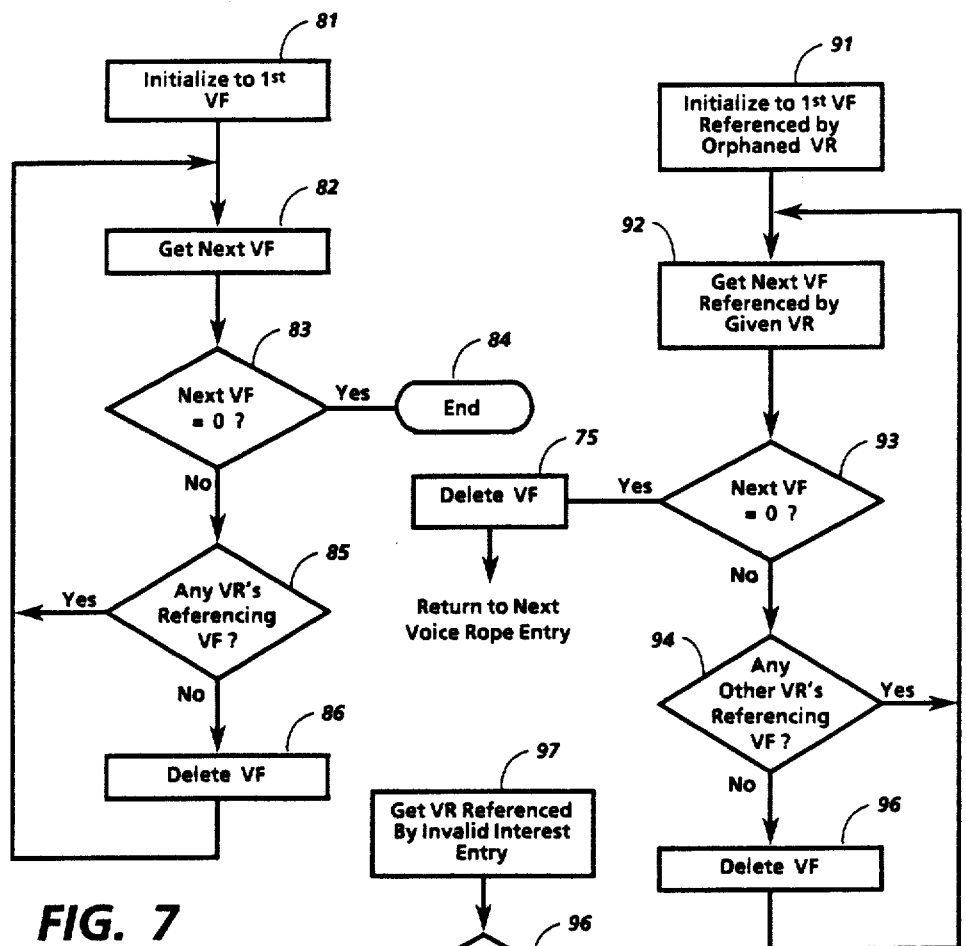
FIG. 7
FIG. 8
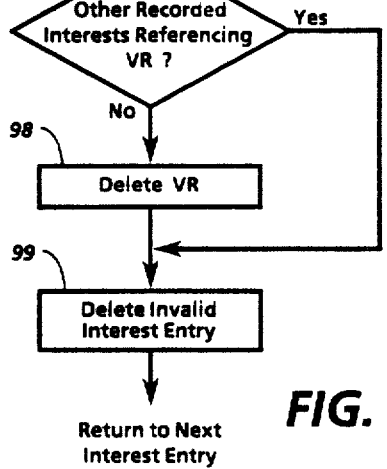
FIG. 9

GARBAGE COLLECTOR FOR HYPERMEDIA SYSTEMS

FIELD OF THE INVENTION

This invention relates to distributed digital computer systems (including systems having heterogeneous operating environments) and, more particularly, to methods and means for (1) enabling users of such systems to create, manipulate, share and make virtually unrestricted use of data intensive files, such as digital voice and music files, "scanned-in" image files, and animated or full motion video files, while (2) avoiding the need for making, storing and handling multiple copies of such files, and (3) reclaiming storage space allocated to such files when they are no longer needed.

BACKGROUND OF THE INVENTION

Traditional distributed computer systems have limited users to alphanumeric and simple graphics communications (collectively referred to herein as "textual communications"), even though voice, video and even musical media frequently are more efficient and effective for interpersonal communications. Others have recognized the need to extend such systems sufficiently to support non-textual communications as an alternative or supplement to textual communications. For example, substantial effort and expense have been devoted to the development of voice message systems, as well as to the development of multi-media systems for annotating text with voice. Voice is the non-textual communication medium that has been most widely investigated for use in distributed computer systems, so this invention will be described in that context to provide a representative example. Nevertheless, it will be understood that the broader aspects of this invention are also applicable to other types of data intensive, non-textual communications in distributed computing systems.

Several interesting and potentially important advantages flow from treating voice and other non-textual media as data in a distributed computing environment. See Nicholson, "Integrating Voice in the Office World," *Byte*, Vol. 8, No. 12, December 1983, pp. 177-184. It enables non-textual media to be incorporated easily into electronic mail messages, and into annotations applied to ordinary text files, as well as into prompts and other interactive messages provided by the user interface to the computing environment. In short, such a treatment permits users to create, manipulate and share these non-textual data files in much the same way as they handle conventional test files, and enables programmers to implement functions having such non-textual data files in generally the same way as they implement functions involving text files.

However, voice and other non-textual data files differ significantly from ordinary textual data files. For example, classical workstations cannot record or play voice data files in analog form, so special devices are needed for that purpose. Even more significantly, voice data files typically are much larger than text files containing the identical words. Indeed, the recording of standard telephone quality, uncompacted voice consumes roughly 64K bits of storage per second, which is several orders of magnitude greater than the storage capacity required for an equivalent passage of types test. Still another factor to be taken into account is that there are stringent real time requirements on transferring voice because unintended pauses or chopping of words during the playback of voice creates a perceptual problem that may interfere with or even defeat the effort to communicate.

Users of distributed computer systems sometimes reside in heterogeneous computing environments having diverse network services implemented through the use of different communication protocols. Moreover, traffic between such computing environments may be routed through a variety of common or private carriers which conceivably may involve different path switching schemes. Gateways have been developed for exchanging textual message traffic between heterogeneous environments, so the value and use of non-textual communications in such systems may depend in significant part on the ease with which non-textual communications may be transferred through such gateways.

Others have addressed some of the issues that need to be resolved to carry out voice and similar non-textual communications in distributed computing environments. The Sydis Information Manager utilizes special workstations (called "VoiceStations") for recording, editing and playing back voice. See Nicholson, "Integrating Voice in the Office World," *Byte*, Vol. 8, No. 12, December 1983, pp. 177-184. Additionally, a system for integrating voice and data for simple workstation applications has been described. See Ruiz, "Voice and Telephone Applications for the Office Workstation," *Proceedings 1st International Conference on Computer Workstations*, San Jose, Ca., November 1985, pp. 158-163. Speech storage systems having facilities for recording, editing and playing back voice have been proposed. See Maxemchuck, "An Experimental Speech Storage and Editing Facility," *Bell System Technical Journal*, Vol. 58, No. 9, October 1980, pp. 1383-1395.

Even more to the point, there are the systems that enable users to share documents containing embedded references to non-textual media objects residing on a shared file service and for "garbage collecting" those objets to reclaim the storage space allocated to them when there no longer are any documents or document folders containing references to them. See Thomas et al., "Diamond: A Multimedia Message System Built on a Distributed Architecture," *Computer*, Vol. 18, No. 12, December 1985, pp. 65-78. Systems, such as the Diamond Systems, which employ textually embedded references to refer to voice, video and other diverse types of non-textual data sometimes are referred to as "hypermedia systems." See Yankelovich et al., "Reading and Writing the Electronic Book," *Computer*, Vol. 18, No. 10, October 1985, pp. 15-30. Unlike most of the other systems that have been proposed, the embedded references used by the Diamond system avoid the need to include copies of the non-textual data files (i.e., voice files) in each document file with which they are associated. However, the simple reference count based garbage collection scheme of the Diamond System is incompatible with permitting references to internally stored objects to be included in documents or document folders that are stored outside the system.

Interesting prior art relating to the garbage collection of ordinary data files also has been uncovered. The Cambridge File Server requires clients to take an explicit action to prevent files from being garbage collected, because it automatically deletes files that are not accessible from client updated and server maintained indices. See Mitchell et al., "A Comparison of Two Network-Based File Servers," *Communications of the*

ACM, Vol. 25, No. 4, April 1982, pp. 233-245. Somewhat less relevant, but still interesting as an example of how to build a highly reliable reference server is the system described in Liskov et al., "Highly-Available Distributed Services and Fault Tolerant Distributed Garbage Collection," *Proceedings of Symposium on Principles of Distributed Computing*, Alberta, Canada, August 1986, pp. 29-39. The garbage collection scheme they envision requires all sites that store references to remotely stored, shared objects to run a garbage collector locally for purposes of sending information about distributed references to a common reference server.

At least two issues still have to be resolved. In view of the very large size of most non-textual data files (e.g., voice data files), it is important that a technique be developed for editing those files through the use of simple databases, without requiring that the files be moved, copied, or decrypted (if they are stored in encrypted form), and for describing the results of the editing operations. Also, an improved technique is needed for using simple databases to support a garbage collector for automatically reclaiming storage space allocated to obsolete non-textual data files. The management and editing of hypermedia is addressed in our concurrently filed, copending and commonly assigned U.S. patent application of Swinehart et al, which was filed under Ser. No. 07/118,492 on a "Server Based Facility for Managing and Editing Embedded References in Hypermedia Systems," (D/87278), so this application is directed to the garbage collection issue.

SUMMARY OF THE INVENTION

In accordance with the present invention a database of interests is maintained in a distributed computing system to register the individual interests of users in centrally stored non-textual media files, such as digital voice, music, scanned-in image, and video files, uniquely named piece table style persistent data structures are employed to give users controlled access to the underlying non-textual media files by embedded name reference to such piece tables in ordinary message or text files, so a database of piece tables is also maintained. A garbage collector periodically enumerates the interest database to delete interest entries which have been invalidated. Aged piece tables are deleted from the reference database when there no longer are any recorded interests referring to them, and non-textual media files are deleted to reclaim the storage space allocated to them when there no longer are any piece tables referring to them.

BRIEF DESCRIPTION OF THE DRAWINGS

Still other features and advantages of this invention will become apparent when the following detailed description is read in conjunction with the attached drawings, in which:

FIG. 7 is a simplified functional flow diagram of a voice file garbage collector;

FIG. 8 is a simplified partial functional flow diagram for an integrated voice rope/voice file garbage collector, and FIG. 9 is a simplified partial functional flow diagram for an integrated interest/voice rope garbage collector.

DETAILED DESCRIPTION OF THE PREFERRED EMBODIMENTS

While the invention is described in some detail hereinbelow with reference to a single, illustrated embodiment, it is to be understood that there is no intent to limit it to that embodiment. On the contrary, the intent is to cover all alternative, modifications and equivalents falling within the spirit and scope of invention as defined by the appended claims.

Figure 1:
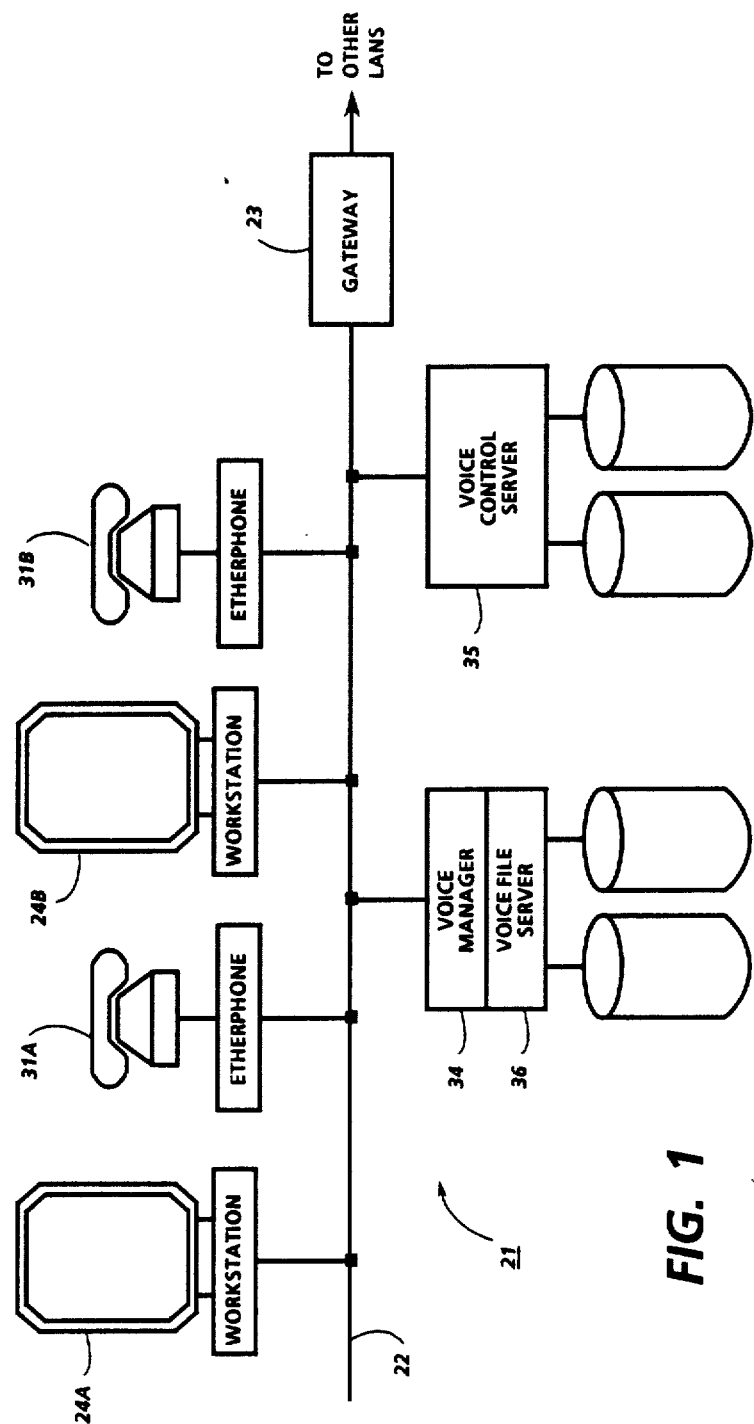
FIG. 1 is a schematic illustrating a pair of local area networks which are on command linked by gateways and a communications channel, with the networks being configured in accordance with this invention to support voice communications in addition to ordinary textual communications.

Turning now to the drawings, and at this point especially to FIG. 1, there is a distributed computer system 21 (shown only in relevent part) comprising a local area network ("LAN") 22 with a gateway 23 for interfacing it with another LAN (not shown), directly or possibly via a switched communications facility. In keeping with the usual configuration of CSMA/CD (i.e., Ethernet) networks, the LAN 22 has a linear topology for linking a plurality of workstations 24a and 24b but it will be evident that it or any other LAN with which it is interfaced may have a different topology, such as a ring-like topology. Still other examples of the heterogeneous environment that may exist given the diverse characteristics of commercially available workstations and LANs will be apparent, so it is to be understood that the gateway 23 performs the reformatting and retiming functions that are required to transfer data from a LAN operating in accordance with one communications protocol to another LAN operating in accordance with a different communications protocol. Additional gateways 23 may be provided if it is desired to extend the system 21 to include still more LANs (not shown).

To enable users to transmit and receive voice messages via the LAN 22 in addition to or in lieu of the usual textual messages and data files that they exchange through their workstations 24a and 24b, there are microprocessor based digital telephone instruments 31a, and 31b, located near, but not physically connected to the workstations 24a, and 24b, respectively. These telephone instruments convert voice into the digital data format required to satisfy the communications protocol of the LAN to which they are connected. For example, the telephone instruments 31a and 31b digitize, packetize and encrypt telephone quality voice for direct transmission over the Ethernet-style LAN 22. For a more detailed description of how that is accomplished, see Swinehart et al., "Adding Voice to an Office Computer Network," proceedings IEEE GlobeCom '83, November 1983, and Swinehart et al., "An Experimental Environment for Voice System Development, IEEE Office Knowledge Engineering Newsletter, February 1987. Both of those references are hereby incorporated by reference. As previously pointed out, the telephone instruments 31a and 31b are not directly attached to the workstations 24a and 24b, as like telephone instruments may be used with diverse workstations, such as may exist in a heterogeneous environment.

In keeping with this invention, the system 21 includes a voice manager 34 which is interfaced with the LAN 22 to provide storage for voice, telephone conversations, music, and other sounds recorded at reasonably high fidelity. Other specialized sources of or sinks for sound, such as a text-to-speech converter (not shown) which receives text strings and returns the equivalent voice data file for playback via one or more of the telephone instruments 31a, and 31b may be included within the voice manager 34 if desired.

A voice control server 35 provides control functions similar to those of a conventional business telephone system and manages the interactions between the other components of the system 21 while they are operating on voice. In keeping with its ordinary telephone system functions, the voice control server 35 allows voice-carrying conversations to be established rapidly between two or more users, as well as between any user and a voice file server 36, via the user telephone instruments 31a and 31b the LANs 22 and, when appropriate, the gateway 23. Additionally, when such a conversation is established, the control server 35 distributes a communications path identifier, ConversationID, to all participants in the conversation, including the telephone instruments and the workstations of the users involved therein, as well as to the voice file server 36 if it is activated to record the conversation. As will be seen, this ConversationID is used to identify the conversation in requests and reports that may be issued by the voice control server 35 or the participants subsequent to the conclusion of the conversation.

All of the control required for voice communications, is accomplished via a remote procedure call (PRC), protocol, which preferably is a secure protocol. See for example, Birrell et al., "Implementing Remote Procedure Calls," *ACM Transactions on Computer Systems*, Vol. 2, No. 1, February 1984, pp. 39–59 and Birrell et al., "Secure Communications Using Remote Procedure Calls," *ACM Transactions on Computer Systems*, Vol. 3, No. 1, February 1985, pp. 1–14. Multiple implementations of the RPC protocol permit the integration of the workstations 24a and 24b for voice operations, even if they are running programs and executing voice applications programmed using different programming environments. As will be seen, reports issued by the voice control server 35 in response to the RPC's it receives during the course of a conversation, keep the participants informed about the relevant system activities in support of the conversation.

Active participants in a conversation exchange voice using a suitable voice transmission protocol. Again, see the above-identified Swinehart et al. article on, "Adding Voice to an Office Computer Network." During each conversation, all transmitted voice is encoded, preferably using a secure encryption, such as DES electronic-codebook (ECB) encryption, based on a randomly generated encryption key issued by the voice control server 35. See, for example, National Bureau of Standards, "Data Encryption Standard," *Federal Information Processing Standard (FIPs)*, U.S. Department of Commerce, Publication No. 46, January 1977. This key is distributed to the participants in the conversation in response to RPC's issued by them, thereby enabling their telephone instruments 31a and 31b, to decrypt the conversation.

Figure 2:
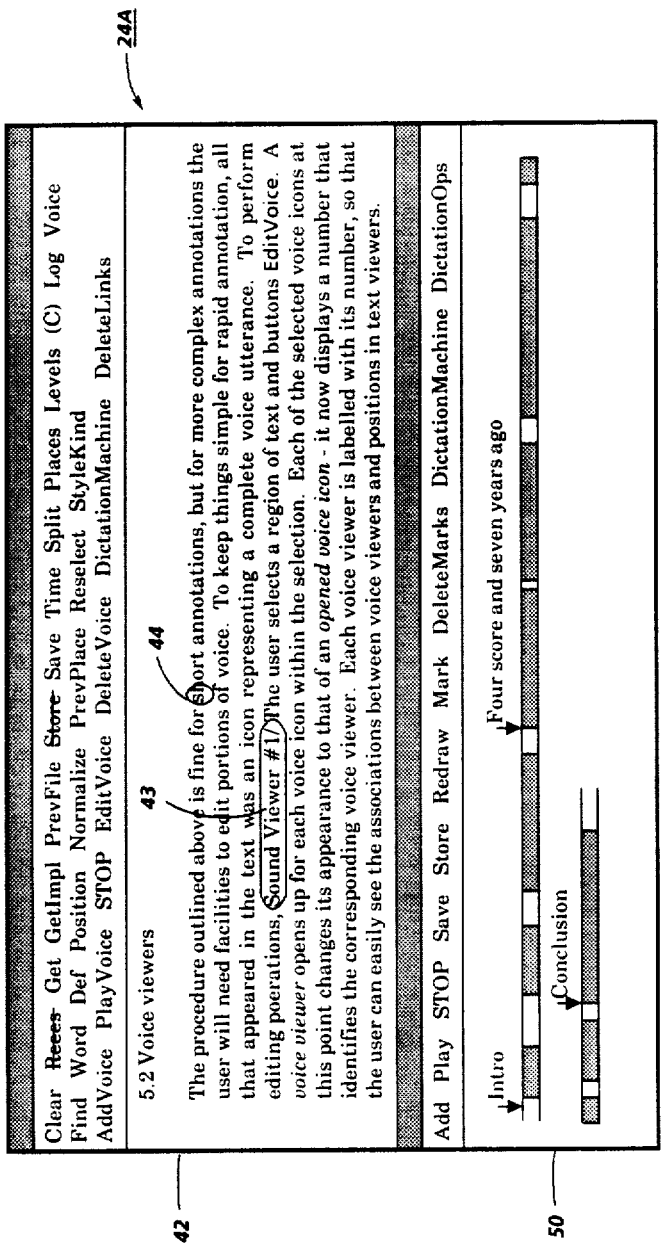
FIG. 2 is a workstation screen illustratiing a suitable user interface for recording, editing, and playing back voice files.

In keeping with one of the more important features of this invention, the workstations 24a, and 24b provide users with enhanced control over the voice capabilities of the system 21. FIG. 2 illustrates the screen 41 of a typical workstation, such as the workstation 24a, as it appears when the user has opened two windows 42 and 43, one to view text annotated with references to voice passages as at 42, and the other to view a graphic representation of a given voice passage, as at 50. These voice references typically are indicated by balloon-like icons embedded in the test of the annotated document, as at 44, so that any selected one of the icons may be "opened" to view its graphical representation as at 50 while playing it back and/or editing it. Suitably, the graphic representation of the voice utilizes a linear string of alternate dark and light bars to represent proportionately long intervals of voice and silence. Silence is detected through a thresholding operation when the energy level of the voice drops below a predetermined threshold level, so it will be understood that such term is used herein in its relative sense.

As a prelude to a description of the voice and other sound editing functions which users can perform through the use of their workstations 24a and 24b, it will be helpful to briefly review the basic RECORD, PLAY and STOP functions which users can invoke. When a user issues a RECORD command, the voice control server 35 issues a conversationID which defines a communication path for connecting the user's telephone instrument to the voice file server 36. The voice manager 34 responds to the ConversationID by allocating storage space on the voice file server 36 for recording a new voice file, VF, and by assigning a unique name, VoiceRopeID, to such voice file. Thereafter, recording continues until the user issues a STOP command. Moreover, while recording is taking place, the voice manager 34 accumulates a count to determine the length of the voice rope, VR, in suitable units of time, such as 1/8000 sec. per unit. In response to the STOP command, all recording or playing operations then in progress or queued for the session identified by the given ConversionID are halted immediately. The PLAY command is similar to the RECORD command, except that it is initiated by a user issuing a VoiceRopeID and a specified interval defining either the entire voice rope or a specified interval of it at a suitable resolution (a resolution of approximately 0.1 ms. in this particular case).

The voice control server 35 responds to the PLAY command by issuing a ConversationID to establish a communications path from the voice file server 36 to the users telephone instrument, and the voice manager 34 causes the voice file server 36 to transmit to the user selected interval of the selected VF as determined by the user specified VRs (ID, interval).

Typically, the RECORD and PLAY operations are performed asynchronously with remote procedure calls that return after they have been queued by the voice file server 36. Queued operations generally are performed in order, thereby enabling the voice manager 34 to utilize a straightforward procedure for generating reports to keep users abreast of the status of their requests. For example, the voice manager 34 suitably returns a RequestID when each queued operation is started and completed, thereby enabling it to make calls to each user involved in such an operation, with the calls typically appearing as follows:

REPORT[RequestID, {started/finished/flushed}]

Voice ropes, VR's identifying recorded voice files, VF's, or portions and combinations thereof are immutable, but can be employed by users to create new immutable VR's through the application of the normal editing functions of their workstations 24a and 24b. To assist with the editing, a DESCRIBE (VoiceRopeID) operation may be invoked to cause the voice manager 34 to return to the workstation of the requestor a list of time intervals that denote the non-silent talkspurts (as used herein, a "talkspurt" is a sequencer of voice samples bonded by a predetermined minimum interval of silence) of the specified VR. This talkspurt list, in turn, is employed to generate the graphical representation of the talkspurts and intervening intervals of silence of the selected VR, as shown in window 43 of FIG. 2. Preferably, a look-up table of the talkspurts associated with all of the voice files, VF's, recorded on the voice file server 36 is maintained to reduce the overload involved in assembling the talkspurt list for a given voice rope.

The conventional text editing operations that can be applied directly to voice rope editing are:

CONCATENATE[VoiceRopeID$_1$, VoiceRopeID$_2$, . . . ]—returns a new Voice ID, to produce a new VR that is the concatenation of existing VR's;

SUBSTRING[VoiceRopeID$_1$ Interval]—returns a new VoiceRopeID, to produce a new VR consisting of a specified interval of an existing VR;

REPLACE[VoiceRopeID$_1$, Interval, VoiceRopeID$_2$]—returns a new VoiceRopeID, to produce a new VR having existing VoiceRopeID$_2$ substituting for a specified interval of existing VoiceRopeID$_1$, thereby performing a composition of the CONCATENATE and SUBSTRING operations; and LENGTH[VoiceRopeID]—returns a length, to determine the length of an existing VR in suitable units of time, such as milliseconds.

Typically, these operations are available via RPC calls to the voice manager 34.

Access controls may be superimposed on the VR's to control playback access to their underlying VF's and to limit editing of the VR's. These access control lists can contain names of individuals or groups. See Birrell et al., "Grapevine: An Exercise in Distributed Computing," *Communications of the ACM*, Vol. 25, No. 4, April 1982, pp. 260-274. For example, such access controls may be established and changed at any time by the creator of a given VR by calling: PERMIT[VoiceRopeID, players, editors] to restrict access to the specified VR to the named players and the named editors. A suitable default setting for the access control mechanism would either provide unrestricted access to the VR or restrict the access to only its creator.

As will be appreciated, VR's have the important advantage that they can be shared by multiple users and can be incorporated into multiple standard textual documents to give authorized users access to the underlying VF's, without requiring that those data intensive non-textual VF's be copied, moved or stored in multiple locations. Moreover, in accordance with an important feature of this invention, users are free to store documents containing VR's on-line or off-line as best suits their individual needs and desires.

To provide such user freedom, while ensuring that space on the file server 36 that is occupied by obsolete VF's is reclaimed in a timely manner, there is an interest based garbage collector for identifying and deleting obsolete VF's, as described in more detail hereinbelow. Preferably, these user interests are user and class-specific, so that they can be generated and deleted automatically based on the ordinary directory operations of each user, with each user being responsible for uniquely identifying his/her own personal interest in a given class. For example, when a user enters a document containing a VR into his/her document directory or mail directory, a RPC may be initiated to register the user's interest in that VR in the voice manager 34 in the following form:

RETAIN[VoiceRopeID, class, interest, userID]

This procedure registers the interest of a specified user in a given VR by a given class (e.g., File Annotation or Message). This operation is idempotent, so successive calls with the same arguments register only one interest in a given voice rope. Additionally, there is a FORGET[VoiceRopeID, class, interest] procedure that is invoked, sometime by an RPC issued to the voice manager 34 when the user deletes the document or message containing the VR from his/her directory (as opposed to moving it to another on-line or off-line directory), and other times as a result of a garbage collection process to be described below. Also, a LOOKUP[class, interest] procedure may be provided to return an unordered list of voice ropes associated with a particular interest to facilitate ordinary system administration functions.

Typically, the interest and class attributes of the user invoked interest mechanism are arbitrary text string values. Preferably, however, the form of the interest value is class specifc, so that each class controls its own name space of interests through the use of a hierarchical, flat or other predetermined form of identifiers for its interest values. The class of an interest, on the other hand, usually identifies the way in which voice ropes are being used for a particular application. For example, a "FileAnnotation" class may be used to indicate that a document shared in a named file is annotated by a set of voice ropes, with the interest field being used to provide the file name. Likewise, a "Message" class may indicate that an electronic mail message references recorded voice, with the interest field containing the unique postmark that is supplied by the message system the particular mail message in which such reference is embedded.

Figure 3:
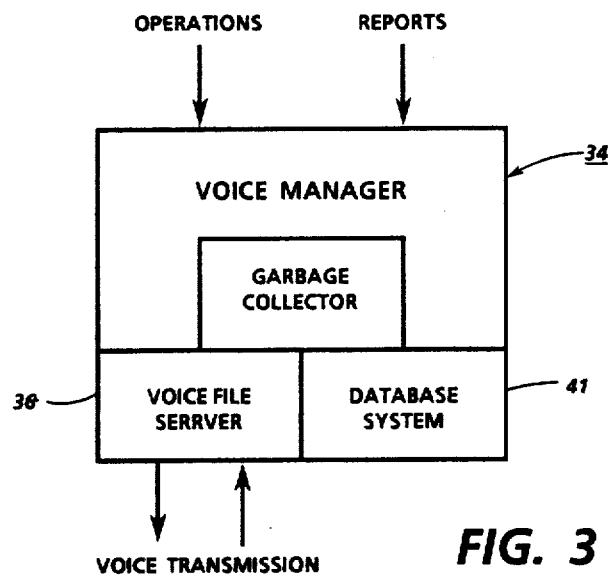
FIG. 3 is a logically layered schematic of a voice manager for a local area network.

The voice manager 34 (FIG. 1) typically is logically layered as shown in FIG. 3 to provide a simple but robust facility for implementing the above-described voice rope editing features and for managing the user interests in such voice ropes and their underlying voice files. The voice file server 36 must be able to maintain a sustained data transfer rate of 64k bits/sec for voice and to accommodate the playback of arbitrarily queued sequences of voice file intervals with adequate buffering being provided to avoid perceptible pauses between successive sequences, but those requirements are relatively modest and easily satisfied given the present state of the art.

A simple database system 41 is provided to implement voice ropes and their related interests. To that end, the database system 41 stores the voice ropes (VR's) as immutable piece tables which refer to immutable files and/or file segments, provides basic query and update capabilities, and supports sharing of the VR's among the many users that may employ them to reference the underlying voice files. Any database system that satisfies these modest requirements would suffice. For example, one such system stores each entry as a sequence of attributes expressed as key/value pairs in a write ahead log, much as described by Gray, "Notes on Database Operating Systems" in Bayer et al., *Operating Systems an Advanced Course,* Springer-Verbig, 1978, pp. 393–481. However, unlike most database systems in which the data is logged only until it can be committed and written to a more permanent location, the write ahead log within the database system 41 is the permanent source of the data (i.e., once written, the data is never moved). Thus, B-tree indices can be built by direct reference to the write ahead log to map the values of one or more keys to the corresponding locations in the log files. Similar techniques have been employed to construct logs for electronic mail systems. See Donahue et al., "Walnut: Storing Electronic Mail in a Database," Xerox Palo Alto Research Center, Technical Report CSL-85-9, November 1985. Also see Lampson, "Hints for Computer System Design," *Proceedings Ninth Symposium on Operating System Principles,* Bretton Woods, N.H., October 1983, pp. 33–48.

The minimum data structure for representing a voice rope consists of [VoiceFileID, key, interval]tuples. Additional attributes may be included for the VoiceRopeID, identity of the creator, access control lists, and overall length of the voice rope. This means that a typical database log entry for a voice rope may have the following form:

VoiceRopeID: Terry.pa#575996078
Creator: Terry.pa
Length: 80000
PlayAccess: VoiceProject ↑ .pa
EditAcces: none
VoiceFileID: 235
Key: 17401121062B 10300460457B
Interval: 0 80000

Such an entry can be used to construct an index that permits voice rope structures to be retrieved efficiently by their VoiceRopeID's. It also permits an index of VoiceFileID's to be maintained, which is useful for garbage collection as more fully described hereinbelow.

Figure 4:
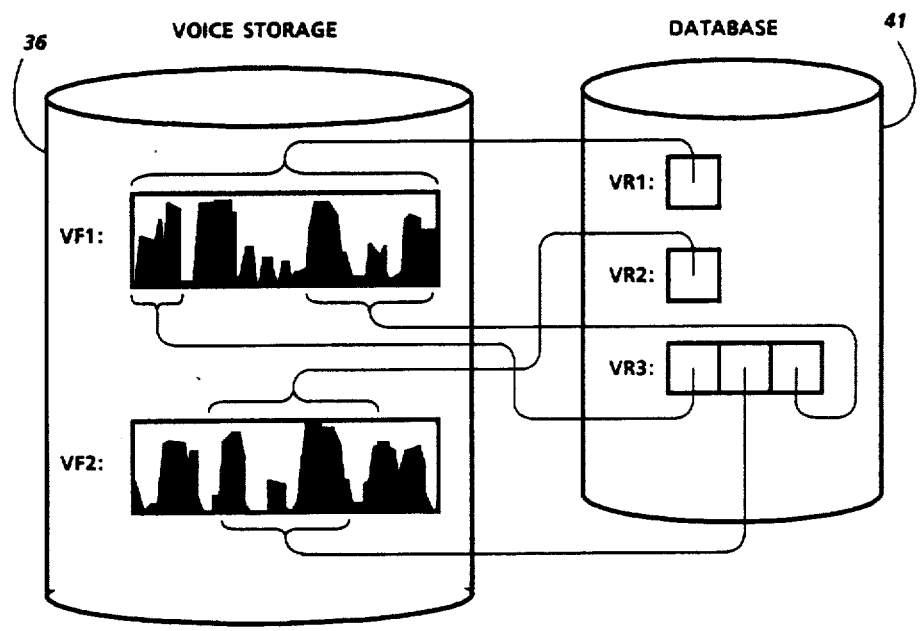
FIG. 4 is a schematic illustrating the correlation of voice files with the data structures that are used to reference them.

As will be recalled, more complex voice ropes can be constructed through the use of the aforementioned voice rope editing process. For example, as shown in FIG. 4, there may be two simple voice ropes, $VR_1$ and $VR_2$, having the following structures:

$VR_1 = <$VoiceFileID: $VF_1$, Key: $K_1$, Interval:
  [start: 0, length: 4000]$>$
$VR_2 = <$VoiceFileID: $VF_2$, Key: $K_2$, Interval:
  [start: 500, length: 2000]$>$ In that event, the operation:

REPLACE[base: $VR_1$, interval: [start: 1000, length: 1000], with: $VR_2$]

produces a new voice rope, $VR_3$, with the structure:

$VR_3 = <$VoiceFileID: $VF_1$, Key: $K_1$, Interval:
  [start: 0, length: 1000],
  VoiceFileID: $VF_2$, Key: $K_2$, Interval:
  [start: 500, length: 2000]
  VoiceFileID: $VF_1$, Key: $K_1$, Interval:
  [start: 2000, length: 2000]$>$ Briefly reviewing the management and editing of digitally recorded voice and other data intensive non-textual data with which this invention may be utilized, it will be recalled that when voice is to be recorded the voice manager 34 calls on the voice file server 36 to create a new VF and to store the voice arriving over a specified conversation with a given conversationID as the contents of this new VF. Upon the completion of the recording, the voice manager 34 adds a simple VR to the voice rope database in the database system 41 to represent the newly recorded VF. The encryption key that was assigned by the voice control server 32 to encode the conversation is stored in the voice rope database entry, so this key is carried along with the VoiceFileID during all subsequent editing operation involving one or more intervals of the VR. The voice data file is neither moved nor copied once recorded in a $VF_1$ even during editing.

When playing a VR, the voice manager 34 first retrieves the VR's structure from the database system 41. If the authenticated identities of all participants in the playback of the VR are consistent with any access controls associated with the VR, the voice manager 34 continues the playback process by distributing the encryption key or keys for the specified intervals of the VF's associated with the given VR to the participants and by causing the voice file server 36 to play those VF intervals in the appropriate order. As previously point out, the voice file server 36 preferably has a sufficiently large output buffer to enable two or more VF intervals to be played without introducing any pauses between them.

Advantageously, the VR's have a flat structure to enhance the playback performance (i.e., a single data base access is sufficient to determine the complete structure of a given VR because each VR directly refers to its associated VF's. Alternatively, complex VR's could be shared as intervals of other VR's in a tree organized database having VR's representing intervals of VF's at the leaves of the tree. This approach would reduce the processing cost of editing VR's, but would increase the number of database accesses required to play complex VR's representing two or more specified intervals of the same or different VF's. In other words, there is a tradeoff to be made to optimize the VR database structure for a particular usage pattern.

As will be appreciated, once all VR's that reference a given VR have been deleted, no VR will ever again reference that particular VF, so the storage space on the voice file server 36 that is allocated to that VF advantageously is reclaimed for subsequent re-use by deleting the VF. A straightforward query of the voice rope database with the database system 41 is sufficient for determining whether there are any VR's still in existence that reference a given VF. However, it is more difficult to determine whether a given VR can be deleted or not. Thus, the above-described "interest" operations are the key to permitting automatic reclamation of VR's and their associated VF's.

Users are required to record their VR interests in a known place, such as in an interests database within the database system 41. These recorded interests then serve as proxies for the VR references which the user passes, thereby providing a logical basis for distinguishing between validly referenced active VR's and invalidly referenced or non-referenced, obsolete VR's. A reference invalidation mechanism, such as a specified timeout period, may be incorporated into a separate interest if desired, so it is to be understood that VR obsolescence occurs when there are no existing valid references to the given VR, including unexpired timeouts.

It was previously pointed out that when a RETAIN procedure is called an entry is added to the interest database, provided that the entry is not already there. This database entry includes the VoiceRopeID, the class of the interest, an interest value, and the user's identification, thereby permitting interest database queries based on any of those attributes. Unfortunately, it is sometimes impractical to modify existing workstations and file servers to call the RETAIN and its complementary FORGET procedures automatically to record and delete users' interests in a given VR when documents or message containing references to that VR are entered into and deleted from the users' directories. It is, however, feasible to incorporate into each user's operating system an additional program that is automatically invoked when the user moves a file containing a VR reference from temporary workstation storage to a file server for more permanent storage, whereby a call of the following type is issued for each voice rope referenced in such file:

RETAIN[VRID: VoiceRopeID, Class "File Annotation,"

Interest: "Annotated File Name Name", User: Authenticated Name]

Thus, at any later time, a standard file server directory enumeration operation can be performed to determine, for any given user interest, whether the user named instance of the file (e.g., "Annotated File Name") containing the VR reference to which the given interest pertains still exists or not. Each user's applications determine the class or classes of the interests registered by such user, and such interests are given user determined values (e.g., "Annotated File Name" for the "File Annotation" class of interests). This means that individual users are responsible for assigning unique values, such as different version numbers, to the different interests they may wish to record within a given class of interests.

For automatically locating and deleting obsolete interests from the interest database, the implementor of any interest class may register a procedure of the following type with the voice manager 34:

IS GARBAGE[VoiceRopeID, Interest]—{Yes/No}

This procedure determines in a class specific manner whether or not a given interest still applies to a specific VR. For example, for the aforementioned File Annotation class, this procedure returns "YES" only if the user specified value of the interest parameter no longer exists on some file server somewhere within the distributed computing system 21.

Figures 5, 6:
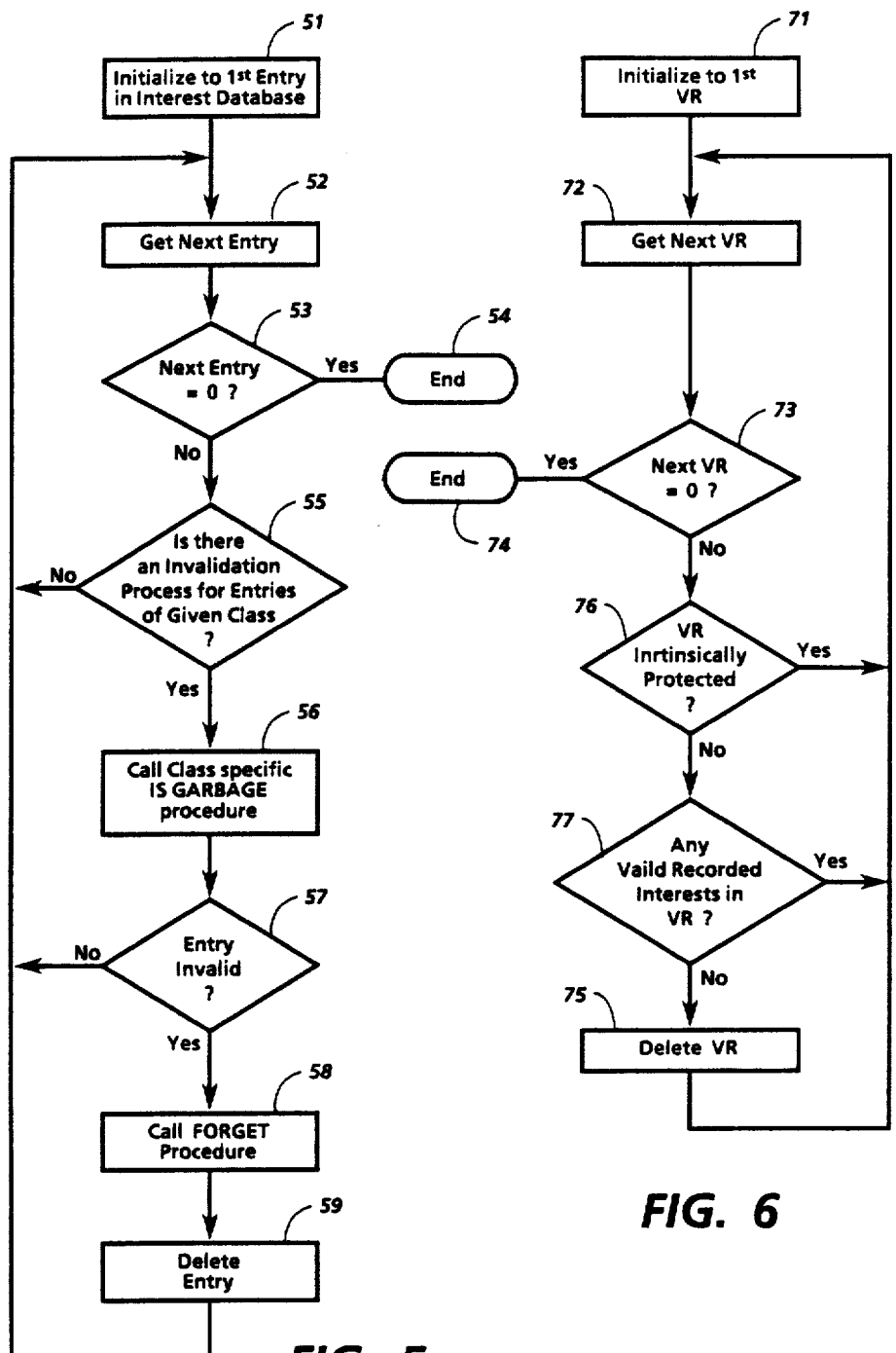
FIG. 5 is simplified functional flow diagram of an interest garbage collectors.
FIG. 6 is a simplified functional flow diagram of a voice rope garbage collector.

Suitably, as shown in FIG. 5, the voice manager 34 includes an interest verifier for periodically enumerating the entries in (hereinafter) simply referred to as enumerating the database of interests, as at 51-54, and for calling the class specific IS GARBAGE procedure (if one has been registered) for each interest, as at 55-56. The IS GARBAGE procedure for any class of interests may utilize various criteria for determining whether an entry within the given class is valid or not, as at 57. For example, the procedure may check the entry against intrinsic invalidation criteria, such as the expiration of a predetermined time out period and consistency with an access control list. It also may issue a directory query to the file servers for the distributed computing system 21 to determine whether the interest value (e.g., "Annotated File Name") specified for the entry being examined still exists on or more of the file servers. If the given interest is determined to be invalid for any reason, a FORGET[VoiceRopeID, class, interest] procedure is called, as at 58, to delete it from the database of interests, as at 59.

Referring to FIG. 6, the voice manager 34 also has a voice rope garbage collector for periodically enumerating the voice rope database, as at 71-74, so that orphaned VR's are deleted therefrom, as at 75. Desirably, provision is made for intrinsically protecting VR's of some or all classes, as at 76 at least for some finite period of time after they are created, so that interested users have a reasonable opportunity to register an interest in them.

However, in the absence of such intrinsic protection, a given VR is deleted from the voice rope database, unless it is determined, as at 77, that the VR being examined is still reference by at least one valid interest in the interest database.

As shown in FIG. 7, a separate voice file garbage collector may be included in the voice manager 34 for periodically enumerating the voice file database, as at 81-84, so that those which are found as at 85, to no longer have any VR's referring to them are deleted, as at 86, thereby reclaiming the storage space on the voice file server 36 (FIG. 1) that was allocated to them.

Alternatively, however, as illustrated in FIG. 8, the voice file garbage collector may be integrated with the voice rope garbage collector, so that those functions are performed concurrently. For example, when it is determined that a given VR has been orphaned, as at 77 in FIG. 6, the VF's referenced by the orphaned VR can be enumerated, as at 91-93. That enables each of those VF's to be checked against the voice rope database to determine whether they are referenced by any other VR's, as at 94, so that orphaned VF's are deleted, as at 95. After all of the VF's referenced by an orphaned VR have been examined, the VR is deleted as at 75, and the process then loops back to continue the enumeration of the VR's with the next VR, as at 72 in FIG. 6.

Likewise, as shown in FIG. 9, the voice rope garbage collector may be integrated with the interest garbage collector. Each entry in the interest database refers to a single VR, so if it is determined that a given interest is invalid, as at 57 in FIG. 5, the interest database may be examined, as at 96 in FIG. 9, to determine whether it still contains other interests referencing the VR associated with the invalid interest, as at 97. If no other reference to the given VR is found, both the VR and the invalid interest entry are deleted, as at 98 and 99, respectively. On the other hand, if other interests referencing the VR exist, only the invalid interest is deleted before looping back to continue the enumeration of the interest database with the next interest, as at 52 in FIG. 5.

SUPPLEMENTAL DESCRIPTION

To supplement the foregoing disclosure, a soon to be published paper of D. B. Terry and D. C. Swinehart, "Managing Stored Voice in the Etherphone System" is attached hereto as Appendix A and incorporated herein by reference.

CONCLUSION

In view of the foregoing, it will now be understood that the present invention provides and efficient and effective garbage collector for hypermedia applications of distributed computing systems.

APPENDIX A

Managing Stored Voice in the Etherphone System

Douglas B. Terry
Daniel C. Swinehart
*Computer Science Laboratory*
*Xerox Palo Alto Research Center*

Abstract: The *voice manager* in the Etherphone™ system provides facilities for recording, editing, and playing stored voice in a distributed personal computing environment. It provides the basis for applications such as voice mail, annotation of multi-media documents, and voice editing using standard text editing techniques. To facilitate sharing, the voice manager stores voice on a special *voice file server* that is accessible via the local internet. Operations for editing a passage of recorded voice simply build persistent data structures to represent the edited voice. These data structures, implementing an abstraction called *voice ropes*, are stored in a server database and consist of a list of intervals within voice files. Clients refer to voice ropes solely by reference. *Interests*, additional persistent data structures maintained by the server, serve two purposes. First, they provide a sort of directory service for managing the voice ropes that have been created. More importantly, they provide a reliable reference counting mechanism, permitting the garbage collection of voice ropes that are no longer needed. These interests are grouped into classes: for some important classes, obsolete interests can be detected and deleted by a class-specific algorithm that runs periodically.

1. Introduction

Voice is an important and widely used medium for interpersonal communication. Computers facilitate interpersonal communication through electronic mail and shared documents. Yet, our computer systems have traditionally forced us to communicate textually. A major focus of the Etherphone™ system developed at Xerox PARC was to allow voice to be incorporated into computing environments and used in much the same way as text. This paper addresses the problems associated with managing stored voice in a distributed computing environment.

The voice management facilities of the Etherphone system were designed with the following goals in mind:

* *Unrestricted use of voice in client applications*

As with text, we want the ability to incorporate voice easily into electronic mail messages, voice-annotated documents, user interfaces, and other interactive applications. Nicholson gives a good discussion of many office applications that are made possible by treating voice as data [17].

* *Sharing among various clients*

If stored voice is to be used as a means of interpersonal communication, then it must be possible for users to easily share a voice passage with one or more colleagues. Clients should be able to share voice as freely as they share files.

* *Editing of voice by programs*

Clients should be able to combine previously recorded voice in various ways and insert fresh voice into existing voice passages. The system should permit programmer control over all of these functions.

* *Integration of diverse workstations into the system*

Our environment contains a diversity of workstations and associated operating systems that must access the voice management facilities. Requiring users to learn and adapt to facilities that cannot be well-integrated into their existing workplaces is unacceptable.

* *Security at least as good as that of conventional file servers*

People are rightfully concerned about the privacy of their communications; the system should take all means to protect this privacy.

* *Automatic reclamation of the storage occupied by unneeded voice*

Requiring clients to explicitly delete voice passages when they are no longer needed places an unwarranted burden on users and hinders sharing in a distributed system. The system itself should aid in the automatic reclamation of voice storage.

<copyright information to be pasted over this by ACM>

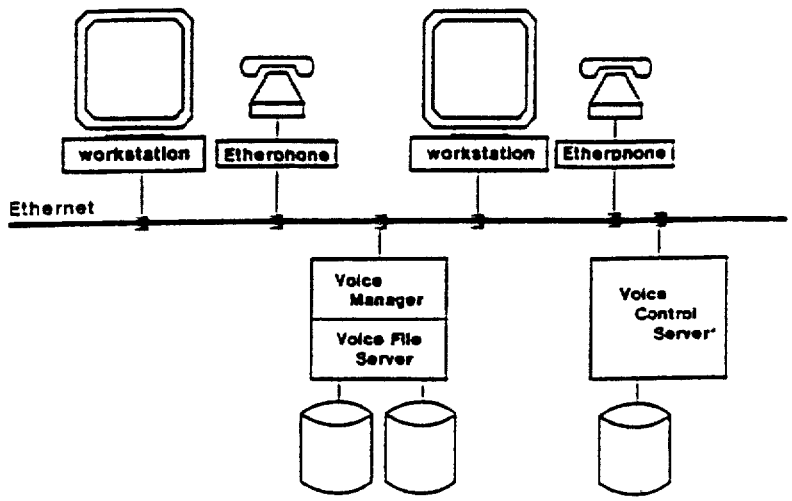

Figure 1. A simple Etherphone system environment.

Many of these features are common in traditional file servers that store text files [21]. The characteristics of voice. however. differ greatly from those of text. Standard telephone-quality uncompacted voice occupies 64 Kbits of storage per second of recorded voice. This is several orders of magnitude greater than the equivalent typed text. Voice also requires special devices for recording and playing it: that is, a user cannot simply type in a voice passage. More importantly. voice transmission has stringent real-time requirements. These differences dictate special methods for manipulating and sharing voice.

An abstraction that we call *voice ropes* serves as the basis of application-independent methods for recording. playing. editing. and otherwise manipulating digitized voice. The major technical contributions described in this paper involve the use of simple databases to:

(1) describe the results of editing operations such that existing voice passages need not be moved. copied. or decrypted. and (2) provide a modified style of reference counting required to allow the automatic reclamation of obsolete voice.

The next section provides the background for the rest of the paper including a quick overview of the Etherphone system architecture as well as some sample voice applications. Section 3 presents the operations on voice ropes designed to support these and future application programs. Section 4 then discusses the design and implementation of the voice rope operations and the rationale governing various design choices. Section 5 relates our experiences thus far with incorporating voice into workstation applications and examines the system's performance. Section 6 contrasts related work. We conclude by reviewing our design goals and how they were met.

2. Background

2.1 The Etherphone system

The Etherphone system is intended for use in a locally distributed computing environment containing multiple workstations and programming environments. multiple networks and communication protocols. and perhaps even multiple telephone transmission and switching choices. The system is intended to be extensible in that introducing new applications. network services. workstations. networks. and other components is possible.

Figure 1 depicts the basic components of the Etherphone system in a simple configuration [24]. Each personal workstation is associated with. but not directly attached to. a microprocessor-based telephone instrument called an *Etherphone*. Etherphones digitize. packetize. and encrypt telephone-quality voice and transmit it directly over an Ethernet. A *voice manager*. the main topic of this paper. provides storage for voice. telephone conversations. music. and other sounds. recorded at reasonable fidelity. The system can also include other specialized sources or sinks of voice. such as a *text-to-speech server* that receives text strings and returns the equivalent spoken text to the user's Etherphone.

A *voice control server* provides control functions similar to a conventional business telephone system and manages the interactions between all the other components. In particular. it allows voice-carrying *conversations* to be established rapidly among two or more Etherphones or voice services. An Etherphone conversation is represented by a conversation identifier. a *ConversationID*. The ConversationID is distributed by the control server to all participants in the conversation. including Etherphones. workstations. and voice services. when the conversation is

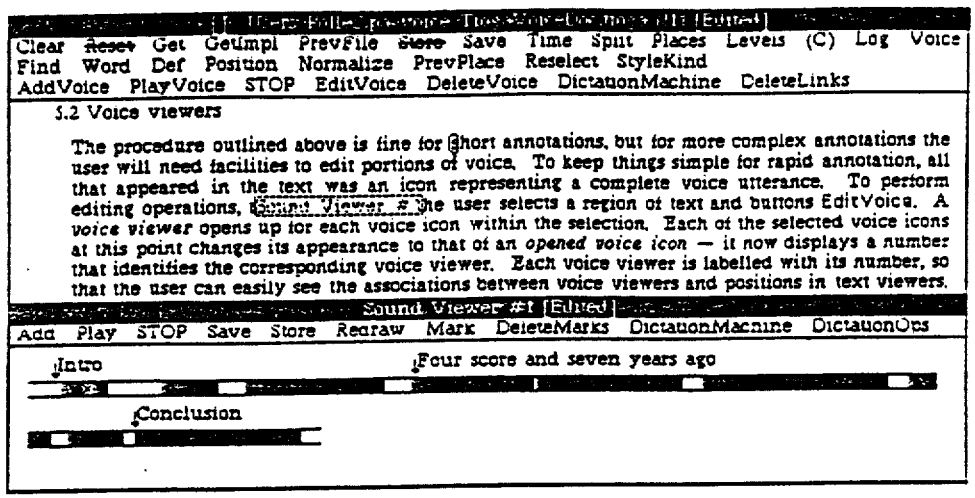

Figure 2. An example of voice annotation and editing.

established. It is used to identify the conversation in requests and reports issued by the server and the participants.

All of the communication required for control in the voice system, such as conversation establishment and the distribution of encryption keys used in voice transmission, is accomplished via a secure remote procedure call (RPC) protocol [4] [5]. Multiple implementations of the RPC mechanisms permit the integration of workstation programs and voice applications programmed in different environments. During the course of a conversation, reports emanating from the voice control server via RPC inform participants about various activities concerning the conversation.

Active parties in a conversation exchange voice using a specialized *voice transmission protocol* [22]. During each conversation, all transmitted voice is encoded using DES electronic-codebook (ECB) encryption [16] with a randomly generated encryption key issued by the voice control server.

Workstations are the key to providing enhanced user interfaces and control over the voice capabilities. The extensibility of the local programming environment—be it Cedar, Interlisp, or the Xerox Development Environment—expedites the integration of voice into workstation-based applications. Workstation program libraries implement the client programmer interface to the voice system. The voice control server associates each workstation with the physically adjacent Etherphone and interprets control requests accordingly. The physical distinction between Etherphones and workstations allows a variety of workstations to be accommodated without requiring additional voice hardware development.

The server software and the initial workstation software was developed in the Cedar programming environment [23]. More information on the equipment and protocols used in the Etherphone system, as well as the applications built to date, can be found in related papers [22] [24].

2.2 Some applications of recorded voice

The desire to annotate documents with voice passages spurred the development of facilities for recorded voice in the Etherphone system. More specifically, users want to attach voice to any point in a document, to play that voice on request, to move or copy annotations readily and quickly, and to store such annotated documents in their host file systems and common file servers. Users want to share annotated documents with their colleagues, who are perhaps using different types of workstations with different file systems and document editors. Users also want the ability to edit voice annotations.

Figure 2 depicts two Cedar *viewers* (windows) involved in a voice editing session. In the top viewer, the Tioga multi-media editor displays a document that includes two voice annotations, normally shown as cartoon balloons. One of the annotations has been "opened" to produce the lower viewer, which uses the alternating dark and light bars to represent intervals of voice and silence proportional to the lengths of the bars. The user employs conventional Tioga editing operations to delete, copy, or reorder sections of the original voice annotation. New spoken material can be recorded into selected locations by invoking special editor extensions. At any time, the user can listen to selected passages. Once edited, the result is then stored back as an amended annotation. This annotation remains with the document and with any copies that are made. The voice editor encourages the replacement and reorganization of recorded voice at the level of entire sentences or phrases. Finer-grained word or phoneme-level operations are discouraged for a variety of practical reasons explored in more depth in related publications [1].

The Etherphone system also includes a voice mail prototype, which is another application of the voice annotation and editing facilities just described. The main difference between mail messages and ordinary annotated documents is that the messages are sent by a general mail transport mechanism to lists of recipients, not manually filed by name in a filing system. Adding voice messaging to an existing environment is complex since mail is often read by a variety of mail programs running on a variety of systems. Most of these programs, both within our own and other interconnected networks, are not yet prepared to play or otherwise deal with recorded voice annotations.

Other applications that need to be able to record, modify, and store voice may employ substantially different user interfaces and storage models than those required of annotated documents. For example, we have found it useful to retain a number of prerecorded prompts, announcements, and attention-getters in a simple directory. Another application that has been proposed would improve the ability to gather data during user studies, by recording the extemporaneous statements of users and synchronizing these recordings with time-stamped logs of other user actions. Additional applications, whose purposes and user interface requirements we cannot know in advance, are expected to be developed in the future.

In general, adding such voice facilities to a diverse and complex software base presents challenging problems to the systems builder since much of the existing workstation and server software cannot be changed or extended. The voice management facilities described in this paper were designed to make such applications less tedious to build, more robust, and easier to comprehend.

3. Operational Overview

3.1 Voice ropes

The implementation of facilities for recorded voice is somewhat involved, but the actions to be performed are conceptually quite simple. In looking for an application-independent abstraction to present to application programmers, it occurred to us that many of these actions closely resembled operations normally associated with text string manipulation. The Cedar system provides a powerful text string abstraction called a *rope* [23]. Cedar ropes are text strings of arbitrary length, represented as memory pointers, or references, to storage that is managed automatically by the Cedar system. When no references to a rope remain active, its storage is reclaimed. Cedar ropes are immutable: once created, its value will not change, so that ropes can be shared simply by sharing references. To create modified values, editing operations are supplied that create new ropes.

By analogy, in the Etherphone system, we refer to sequences of stored voice samples as *voice ropes*. A unique identifier, called a VoiceRopeID, is used instead of a memory pointer to identify each voice rope, because, unlike Cedar ropes, voice ropes are persistent objects with a potentially long lifetime. To aid in sharing and to facilitate the use of voice by heterogeneous workstations, the storage for voice ropes, as well as the operations on them, are provided by a network service, the voice manager.

Clients refer to voice ropes solely by reference, that is, by their unique VoiceRopeIDs. The voice manager places no restrictions on a client's use of voice ropes. Most uses involve embedding speech in some type of document, such as an annotated manuscript, program documentation, or electronic mail. The use of such embedded references to refer to voice, video, and other diverse types of information has been termed a hypermedia system [26].

From a client's perspective, a voice-annotated document should behave as though the voice were stored directly in the document's file rather than being included by reference. For example, once a voice message is sent using electronic mail, the author or another user should not be able to change the message's contents. For this reason, voice ropes, like Cedar ropes, are immutable. The recording and editing operations create new voice ropes; they do not modify existing ones.

3.2 Recording and playing

To record or play a voice rope, a conversation is set up between the voice manager and an Etherphone. The main operations supported by the voice manager are as follows:

RECORD[conversationID] →
voiceRopeID, requestID
Voice received by the server over the communication path defined by the given conversationID is stored and assigned a unique voiceRopeID; recording continues until a subsequent STOP operation is issued. The requestID identifies this operation in subsequent reports (see below).

PLAY[conversationID, voiceRopeID, interval] →
requestID
The specified interval of the voice rope is transmitted over the given conversation. An interval denotes either the entire voice rope or a time-indexed portion of it at a resolution of about 1 ms.

STOP[conversationID]
Any recording or playing operations that are in progress or queued for the given conversation are immediately halted.

The RECORD and PLAY operations are performed asynchronously. That is, the remote procedure call returns after the operation has been queued by the server. Queued operations are performed in order.

The voice manager generates event reports upon the start and completion of a queued operation. The requestID returned by each invocation is used to associate reports with specific operations. In particular, the voice manager makes the following call to all participants in a conversation to inform them of the status of various requested operations concerning that conversation:

REPORT[requestID, {started | finished | flushed}]
The requested operation has been started, successfully completed, or halted by a STOP operation.

Having reports flow from server to clients is conceptually similar to Clark's upcalls and accomplished in a similar manner [7].

3.3 Editing support

Once recorded, voice ropes can be used in editing operations to produce new, immutable voice ropes. Several of the operations on Cedar ropes, such as producing substrings or concatenating existing strings, are directly applicable to voice. Their transliteration for voice ropes yields these functions:

CONCATENATE[voiceRopeID$_1$, voiceRopeID$_2$, ...]
→ voiceRopeID

Produces a new voice rope that is the concatenation of the given voice ropes.

SUBSTRING[voiceRopeID$_1$, interval] →
voiceRopeID

Produces a new voice rope consisting of the specified interval of voiceRopeID$_1$.

REPLACE[voiceRopeID$_1$, interval, voiceRopeID$_2$]
→ voiceRopeID

Produces a new voice rope that is obtained by replacing the particular interval of voiceRopeID$_1$ with voiceRopeID$_2$. This is a composition of the CONCATENATE and SUBSTRING operations provided for efficiency and convenience.

LENGTH[voiceRopeID] → length

Returns the length of the given voice rope in milliseconds.

One additional operation peculiar to voice ropes was provided to aid in editing:

DESCRIBE[voiceRopeID] → intervals

Returns a list of time intervals that denote the non-silent *talkspurts* of the given voice rope. A talkspurt is defined to be any sequence of voice samples separated by some minimum amount of silence.

These operations, available via RPC calls to the voice manager, are intended for use by programmers. Applications that handle voice must employ these operations to construct the facilities visible to the end user.

3.4 Access control

To ensure privacy, access control lists govern who is permitted to play or edit particular voice ropes. Associated with each voice rope are two types of access: *play* access allows a client to play a voice passage while *edit* access allows the client to use it in editing operations. Access control lists may contain any number of individual or group names that are registered with the local name service, Grapevine [3]. The creator of a voice rope can change these access control lists at any time by calling:

PERMIT[voiceRopeID, players, editors]

Restricts access to the specified voice rope to the lists of players and editors.

Each newly-created voice rope is given the default access controls specified by its creator. Typically, voice ropes are initially given unrestricted access or else restrict access to the voice rope's creator. Clients can later adjust permissions explicitly by calling PERMIT. For instance, a mail sending program could routinely set the play access control list for a voice message to be the set of intended recipients.

3.5 Interests

The voice manager also provides operations for managing voice references. These operations provide a sort of directory for voice ropes. Although simple applications can use this directory as their means for naming and locating voice ropes, that is not its primary purpose. As with any storage system, unreferenced storage space should be reclaimed. With voice, or other voluminous media such as video, the need is particularly acute. Because voice ropes are shared by multiple users and multiple documents, manual management is impractical, and some form of garbage collection is required. In the Etherphone system, client code must assist with garbage collection by using the directory operations to express an *interest* in each referenced voice rope. The client operations are listed here while a discussion of the rationale for this approach and a description of the underlying implementation is deferred to Section 4.5:

RETAIN[voiceRopeID, class, interest]

Registers an interest of the particular class in the given voice rope. The interest uniquely identifies a reference to the voice rope within the class. This operation is idempotent: successive calls with the same arguments register at most one interest in the given voice rope.

FORGET[voiceRopeID, class, interest]

Deregisters the specified interest and deletes the voice rope unless there are other interests for it.

LOOKUP[class, interest] → LIST OF voiceRopeID

Returns the unordered list of voice ropes associated with a particular interest.

Both interest and class are arbitrary text string values. The form of the interest value is generally class-specific. That is, each class controls its own name space of interests and may choose to use hierarchical, flat, or some other form of identifiers for its interest values. Clients are responsible for generating unique values for different interests within a class.

The class of an interest identifies the way in which voice ropes are being used by a particular application. For example, we use the class "FileAnnotation" to indicate that a document stored in a named file is annotated by a set of voice ropes; the interest field is the file name. The class "Message" indicates that an electronic mail message incorporates recorded voice; in this case, the interest is the unique postmark supplied by the message system.

A combination of client workstation software and automatic collection methods must hide these interest operations from actual users. Client applications must always register interests in order to ensure retention of voice ropes to which they hold references. For some classes, clients must also explicitly FORGET their interests; for others, such as the "FileAnnotation" class, automatic methods described in Section 4.5 make this unnecessary.

4. Detailed Design Decisions

4.1 Voice manager architecture

The voice manager uses a *voice file server* to store voice data. This server provides RECORD, PLAY, and STOP operations that are semantically similar to those described in Section 3.2, but operate on *voice files*. The more complex voice rope editing and directory structures have been implemented as separate, higher-level components, in part to make the voice facilities independent of the choice of the underlying file storage. Voice ropes in the current implementation are actually made up of pieces of one or more voice files, but they could just as well be references to ordinary Cedar files, direct disk addresses, or address values from any other meaningful space.

The implementations of both voice rope editing and interest management depend on a simple but robust *database facility* that was developed for these purposes. Although the operations for editing voice ropes have been patterned after the Cedar Rope package, a different underlying implementation was necessitated by the disparate characteristics of voice and text. Specifically, voice ropes are persistent, not transitory, values. Additionally, editing voice by actually copying the bytes, as is sometimes done for Cedar's ropes, is expensive since voice is voluminous. Thus, rather than rearranging the contents of voice files to edit them, the voice manager simply builds a data structure using the facilities of the database package. Interests are registered in a similar database.

A *garbage collector* uses interests to reclaim voice storage that is no longer needed. Devising techniques for automatically collecting garbage in a distributed, heterogeneous environment was one of the most difficult problems faced in the design of the voice manager.

The components of the voice manager are logically layered as in Figure 3. Each is discussed in more detail in the following sections.

4.2 Voice file server

A voice file server differs from conventional file servers [21] in that it must support the real-time requirements of voice. In particular, it must be able to maintain a sustained transfer rate of 64 Kbits/sec, and it should be able to support several such transfers

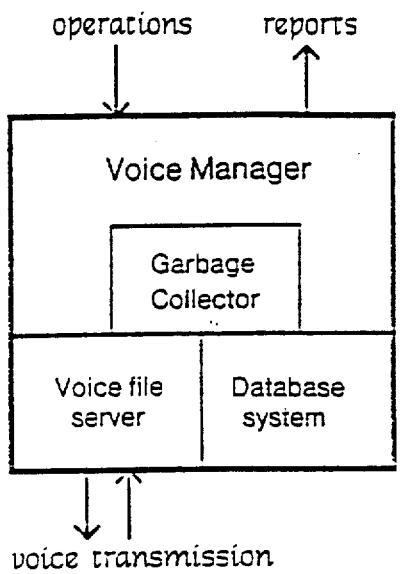

Figure 3. Voice Storage Components simultaneously. There is no inherent reason why a general-purpose file server could not be extended to support these stringent real-time requirements. However, the file systems we had available at the onset of this project, having been optimized for different styles of access, could not, in fact, support them. At present, our file server is a special-purpose extension of Cedar's standard file system [23].

The Etherphone voice file server implements the operations needed to allocate, record, and play voice files that are named by unique identifiers, *VoiceFileIDs*. As previously mentioned, Etherphones encrypt voice as it is transmitted, using the DES encryption key associated with the current conversation. The voice file server simply stores the voice in its encrypted form. The voice rope implementation assumes responsibility for managing the encryption keys associated with various voice files. The stored voice is never decrypted except by an Etherphone when being played. Tables locating the boundaries between sound and silence are stored along with the voice to permit efficient execution of the DESCRIBE operation.

We will not describe the workings of the voice file server in greater detail. For the purposes of this paper, we assume that the reliable recording of voice files and the reliable playing of arbitrary queued sequences of voice file intervals are solved problems. We also presuppose the existence of relatively high-bandwidth network connections between the voice file server and Etherphones, a condition that is easy to meet in our local network environment.

4.3 Database facilities

Voice ropes and interests rely on a simple database management system for their implementation. The requirements placed on the database system are not particularly stringent. It need only store immutable objects, provide basic query and update mechanisms, and support sharing among many client programs. There is no need for multi-object atomic updates, join operations, or comprehensive query languages. Any database system satisfying these modest requirements would suffice. Since such a system was not available in the Cedar environment, we developed a simple, robust database representation that is particularly well-suited to voice ropes.

The database system stores each entry, a sequence of attributes expressed as key/value pairs, in a write-ahead log [10]. Unlike most database systems in which the data is logged only until it can be committed and written to a more permanent location, the log is itself the permanent source of data. Once logged, the data is never moved. To allow rapid queries or enumeration of database entries, B-Tree indices [2] are built to map the values of one or more keys to the corresponding locations in the log file.

This log-based database package was inspired by similar methods found in the Walnut electronic mail system [8] and recommended by Lampson [12]. In addition to managing the storage of voice ropes and interests, it has been used successfully for other data management needs in the Etherphone system.

4.4 Voice rope structure

The data structure representing a voice rope consists of a list of [VoiceFileID, key, interval] tuples. Additionally, an entry in the voice rope database contains attributes for the identifier, creator, access control lists, and overall length of the voice rope. Thus, a typical database log entry for a voice rope is as follows:

VoiceRopeID: Terry.pa#575996078
Creator: Terry.pa
Length: 80000
PlayAccess: VoiceProject†.pa
EditAccess: none
VoiceFileID: 235
Key: 17401121062B 10300460457B
Interval: 0 80000

A database index allows voice rope structures to be retrieved efficiently by VoiceRopeID: an index is also maintained on VoiceFileIDs, which is useful in garbage collection.

The database entry given above is for a simple voice rope consisting of a single interval within a single voice file. More complex voice ropes can be constructed using the editing operations presented in Section 3.3. For example, suppose two simple voice ropes, $VR_1$ and $VR_2$, exist with the following structures:

$VR_1$ = <VoiceFileID: $VF_1$, Key: $K_1$, Interval:
[start: 0, length: 4000]>
$VR_2$ = <VoiceFileID: $VF_2$, Key: $K_2$, Interval:
[start: 500, length: 2000]>

Then the operation

REPLACE[base: $VR_1$, interval: [start: 1000, length: 1000], with: $VR_2$]

produces a new voice rope, $VR_3$, with the structure:

$VR_3$ = <VoiceFileID: $VF_1$, Key: $K_1$, Interval:
[start: 0, length: 1000],
VoiceFileID: $VF_2$, Key: $K_2$, Interval:
[start: 500, length: 2000],
VoiceFileID: $VF_1$, Key: $K_1$, Interval:
[start: 2000, length: 2000]> as depicted in Figure 4.

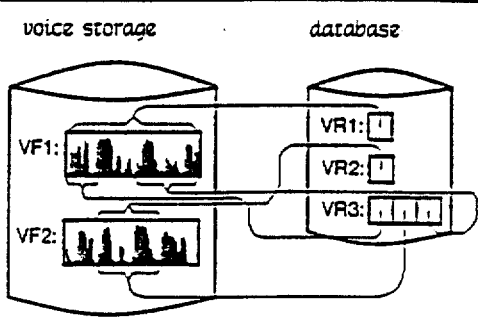

Figure 4. Structure of $VR_3$ after REPLACE operation.

To record a new voice rope, the voice manager calls on the voice file server to create a new voice file and store the voice arriving over a specified conversation as its contents. Once recording completes, a simple voice rope is added to the voice rope database to represent the complete voice file just recorded. The encryption key used to encode the conversation, and hence the voice file, is stored in the voice rope's entry. This key is carried along with the VoiceFileID during subsequent editing operations involving intervals of the voice rope. Independently enciphering small blocks of voice using ECB encryption [16] ensures that voice can be edited on millisecond-resolution boundaries while remaining encrypted. Note that the actual voice is neither moved nor copied once recorded in a voice file, even during editing.

When playing a voice rope, the voice manager retrieves the voice rope's structure from the database, checks access permissions against the caller's authenticated identity, distributes the encryption keys of the various intervals to the parties participating in the conversation, and calls upon the voice file server to play the intervals of the voice rope in the appropriate order. The voice file server provides sufficient buffering to support playing a queue of two or more voice file intervals without introducing gaps between the intervals.

The structure of voice ropes is kept "flat" to enhance playing performance. By having each voice rope refer directly to voice files, only a single database access is required to determine the voice rope's complete structure. An alternative design, more closely modeled on the Cedar Rope abstraction, would store complex voice ropes as intervals of other voice ropes. In such a design, a voice rope would be expressed as a tree of other voice ropes with intervals of voice files at the leaves of the tree. This alternative design would reduce the work associated with each editing operation, but would increase the number of database accesses required to play a voice rope. The flat design was chosen because it improves playing behavior, and, in practice, playing is much more frequent than editing. Moreover, it yields simpler and more compact data structures when used to represent small numbers of coarse-grained edits to voice. The alternative tree design would be a sensible approach within an environment optimized for a different distribution of usage patterns.

4.5 Storage reclamation

4.5.1 Rationale for interests

Once all voice ropes that reference a given voice file have been deleted, no voice rope will ever again refer to that voice file, so the voice file can be deleted as well. This condition is easily determined by a database query. The more difficult problem is deciding when voice ropes themselves can be reclaimed. The interest operations of Section 3.5 were included primarily to permit automatic reclamation of storage for voice ropes and their associated voice files.

From the client standpoint, the most straightforward method for garbage collecting voice ropes would be periodically to examine all of the clients' storage for references to voice ropes, then to collect any unreferenced ropes in a conventional sweep pass. Unfortunately, this sort of distributed garbage collector would be impossible to implement in our open, heterogeneous environment. We do not wish to restrict the uses clients make of voice ropes, or how and where clients store VoiceRopeIDs.

A common alternative is to provide a reference counting scheme in which counters are used to determine the number of clients interested in a particular object. When an object's counter goes to zero, the object's storage can be reclaimed. The burden is placed on clients to increment and decrement the counts for the objects that they are using.

The use of standard reference counting presents formidable problems in a distributed environment. Reference counts cannot be managed reliably unless an atomic transaction can be made to span all of the activities involved in the creation and deletion of a reference. We consider this impractical to arrange, given our desire to accommodate a heterogeneous collection of participating systems. Without transactions, if the server or client fails in the process of incrementing or decrementing a reference count, the client may be left in an uncertain state regarding the outcome of the operation. In particular, client failure-recovery procedures might incorrectly repeat a reference count operation. Furthermore, it is not always possible to arrange for a reference count to be decremented, such as when a reference-containing file residing on a non-collaborating server is deleted. Lastly, reference counts are anonymous, giving no help in locating erroneous references.

Interests were designed to remedy these shortcomings associated with simple reference counts. In a way, interests represent a return to the full-scan method first proposed: since an examination of the entire environment is not possible. clients are required to record their voice rope interests in a known place. The interests serve as proxies for the actual references for reclamation purposes. Interests address two problems: how to retain voice ropes for which references exist. and how to determine when voice ropes can be reclaimed.

*4.5.2 Retention of voice ropes*

The use of interests to retain voice ropes is straightforward. Calling RETAIN adds an entry to the system's *interest database*. provided the entry is not already there. recording the supplied VoiceRopeID. class. and interest values along with the user's identification. The interest database includes indices permitting queries based on any of these attributes. Since a given entry appears in the database at most once. the RETAIN operation is idempotent. It can be safely retried in case of failures or uncertainty. The information stored in the interest database is sufficient to allow either human administrators or client applications to determine whether or not an interest is still valid.

*4.5.3 Interest invalidation*

Determining when to invalidate interest entries is more involved. Some client programs can determine both when to RETAIN an interest and when to FORGET it. One example is the electronic mail system that implements the "Message" class for which the interest design was first developed. When the mail system deletes an instance of a text message that contains voice references. it issues a FORGET for all of the associated voice ropes. Another example is the "SysNoises" class. a set of useful recorded announcements and sounds that system administrators manage manually. The FORGET implementation simply deletes the associated interest entry or entries from the interest database. ignoring requests to delete nonexistent entries to ensure that FORGET is also an idempotent operation. When every interest for a voice rope has been forgotten. the voice rope is vulnerable for deletion.

As we discovered when we began including voice ropes as annotations embedded in ordinary structured text documents. arranging for clients to issue FORGET actions at the necessary times is not always easy. Consider the following scenario. A user records a voice rope and embeds a reference to it in a document: an interest in the voice rope is then registered for the document. The user then copies this document from his workstation to a public file server and announces its existence in a message to interested parties. Several months later. he deletes the file. without remembering that it had voice annotations. Unless further actions are taken. the interest. and hence the referenced voice rope. will never be reclaimed.

Expecting an arbitrary file server to delete interests is not really reasonable. In the above scenario. one could argue that the file server should have issued the necessary FORGET operation when the file was deleted. However. this implies that the software running on the file server could or should be modified to recognize the existence of files containing voice references. to understand their internal structures. and to take appropriate action. Many of the file servers in a typical network environment. including ours. cannot be so modified. either because they are old and written in some obscure programming language. or because they were purchased from outside vendors from whom source code is not available.

In this case. although interests cannot be explicitly deleted by the agents whose actions invalidate them. the voice manager can determine automatically when a particular interest is no longer valid. Suppose that a knowledgeable workstation client program issues the operation RETAIN[vrID: voiceRopeID. class:
"FileAnnotation". interest: "annotatedFile"]

for each voice rope referred to in a file as the file is moved from temporary workstation storage to the file named "annotatedFile" on a public file server. At any later time. standard directory operations can be used to determine whether that specific named instance of the file still exists: if not. the associated interest is no longer valid and can be deleted.

*4.5.4 Garbage collection*

For automatically locating and removing outdated interests. the implementor of any interest class can register a procedure of the following type with the voice manager:

GARBAGE[voiceRopeID. interest] → {Yes | No}
Determines in a class-specific way whether or not the given interest still applies to the particular voice rope.

As an example. for the class "FileAnnotation". this procedure returns Yes if and only if the file instance identified by the interest parameter still exists on some file server. A "Timeout" class records an expiration time as its interest value: its GARBAGE procedure returns YES when the timeout has expired.

An *interest verifier* periodically enumerates the database of interests and calls the class-specific GARBAGE procedure for each interest. If the procedure returns Yes. then the verifier calls FORGET[voiceRopeID, class, interest] to delete the interest from the database.

A garbage collector for voice ropes also runs periodically. For each voice rope in the database. the collector (1) deletes the voice rope if no interests exist that reference it. and (2) deletes voice files used by the voice rope if they are no longer a part of any other voice rope. This process refuses to collect voice ropes that are too young in order to prevent a newly created voice rope from being collected before a client has the opportunity to express an interest in it. This method will find all unreferenced voice ropes. including those for which no client ever expressed an interest and those that might have been orphaned due to system errors: otherwise. the actions of FORGET alone would be sufficient to eliminate unreferenced entries from the voice rope database. Note that. unlike a mark-and-sweep style garbage collector. these algorithms can be safely executed while the system is running and need not complete a full pass through the database in order to perform useful work.

The decision to protect voice ropes for a time after their creation was a pragmatic one. An earlier design required the client programmer to specify an interest. possibly of class "Timeout". for every voice rope created in order to force an explicit statement of the minimum conditions for deleting it. But since many voice ropes are often created in the process of editing an annotation or voice message. this approach would generate unnecessary interests protecting these intermediate values. Instead. by choosing a minimum lifetime comparable to the interval between invocations of the garbage collection procedures. we leave ample time for a properly functioning application to express an interest in the final result.

In summary, garbage collection takes place on three levels. The voice manager deletes voice files when they are no longer referenced by voice ropes. Voice ropes are deleted if they are old enough and no interests exist for them. Interests are either explicitly forgotten by client applications or automatically deleted based on a class-specific test for validity.

5. Experience and Evaluation

5.1 Current usage

Approximately 50 Etherphones are in daily use in the Computer Science Laboratory. Our current voice file server runs on a Dorado [11], a 2-3 MIPS workstation developed at Xerox PARC, with a 300 Mbyte local disk. Thus, it has the capacity to store over 7 hours of recorded voice; the actual storage capacity depends on the amount of suppressed silence. Most of our user-level applications to date have been created in the Cedar environment [23], although limited functions have been provided for Interlisp and for stand-alone Etherphones. We have had a voice mail system running since 1984 and a prototype voice editor available for demonstrations and experimental use since the spring of 1986.

The current voice rope database contains approximately 2000 voice ropes with a total of 7000 segments referencing about 800 distinct voice files. Thus, the average voice rope consists of 3.5 segments, and an average voice file is used by 2.5 voice ropes. Half of the voice ropes have only a single segment, but some have over 20 segments. Half of the voice files are used by exactly one voice rope.

Voice ropes have an average length of 15.5 seconds. 95% are less than 45 seconds in duration. The average segment size among edited voice ropes is 3 seconds, which is in accordance with our preference for large-grained edits.

51 MBytes of storage is used by the voice file server to store the collection of voice files whose aggregate length is 54 MBytes. Thus, only about 5% in storage is saved by suppressing silence. Summing up the total lengths of all voice ropes yields 180 MBytes, which indicates that a factor of 3 is gained through using the database to represent edits.

A majority of the voice ropes in the current database were created in order to test the voice manager itself or its applications during their development, and are therefore somewhat artificial. We would expect voice ropes representing annotations in actual production use to be somewhat longer on average, to consist of longer average segments, and to contain fewer edits. Presently, the interest database has not grown large enough to provide interesting statistics.

5.2 Voice-annotated documents

Manipulating stored voice solely by textual references, besides allowing efficient sharing and resource management, has made it easy to integrate voice into documents. For example, we were able to build a local voice mail system without changing the mail transport protocols or servers. Also, annotated documents can be stored on conventional file servers that are not aware that the documents logically contain voice. The annotation applications utilized facilities already available in the Tioga editor for associating additional named properties with arbitrary locations within a document.

Significant performance benefits accrued by having documents refer to voice that is stored remotely. Although most requests to record or play voice ropes are initiated from a workstation, the voice data is never received by the workstation; instead, it is transmitted directly to the associated Etherphone. A typical text document containing several voice ropes as annotations might occupy 30,000 bytes of storage, whereas inclusion of the voice, assuming a minute of total commentary, would swell its size to 500,000 bytes or greater. In fact, scanned images are included in Tioga documents by value, and the resulting sizes do present storage and performance problems even for high-performance workstations.

Sharing documents and electronic messages that have been annotated with voice references, however, requires high-bandwidth network connectivity among the participants. Providing the applications described here among remote sites connected by limited-bandwidth channels would require additional mechanisms, such as those developed as part of DARPA's experimental multimedia mail project [18], which are beyond the scope of this paper.

5.3 Editing voice

We gained considerable experience with the voice manager by building the Cedar voice editing system described in Section 2.2 and illustrated in Figure 2. The small set of editing operations provided by the voice manager, including the specialized DESCRIBE operation that identifies the sound and silence intervals, has proven to be a sufficient base on which to build a complex voice editor and a dictation machine. However, to reduce traffic to the voice manager, the Cedar voice editor maintains its own data structures to represent the edited voice temporarily. That is, the voice editor ended up replicating much of the functionality of the voice manager, something we were trying to avoid. Only when a user elects to save the edited voice passage does the voice manager get called to perform the necessary operations. Given this situation, a better approach may have been to let clients simply pass the voice manager a complete voice rope specification that it could store in its database.

Experience with the initial implementation of the voice manager revealed that editing a voice passage invariably produced a set of "temporary" voice ropes used only in the construction of the finished result. These objects were eventually collected by the garbage collector and did no permanent harm, but they did create additional work for the voice manager. To alleviate the problem somewhat, the voice manager's interface was changed slightly so that an interval could be supplied for any voice rope parameter in any operation. This substantially reduced the voice editor's use of the SUBSTRING operation.

Event reporting is important in allowing the voice editor to coordinate its visual feedback with the activities of the voice file server. In particular, the voice editor moves a cursor along the screen as a voice rope is being played (the gray marker below the word "score" in the voice displayed in Figure 2). A report indicating that the playing of a particular voice passage has started or finished is essential to synchronize the movement of the cursor with the transmission of voice data.

Although the voice file server writes files on disk so that 1-second segments can be continuously transferred, clients are allowed to edit voice ropes on 1-millisecond boundaries. The file server could not possibly play a voice rope in real time if it had to perform a disk seek every millisecond. Fortunately, users of the voice editor are encouraged to insert, delete, and rearrange voice passages at the granularity of a sentence or phrase rather than trying to modify individual words or phonemes [1]. Thus, in practice, one rarely sees segments of a voice rope that are less than several seconds in length.

5.4 Interests

The notion of grouping interests into classes and providing class-specific garbage collection algorithms is a useful and workable concept. However, we are still groping with the details of how best to use these mechanisms. We have found several interest classes to be useful in Cedar.

The Cedar mail system automatically registers and deregisters interests of class "Message" as voice messages are saved and deleted by recipients. In addition, a "Timeout" class has been used to retract an interest automatically after a certain amount of time. For instance, when sending a voice message, a timeout of a week or two can be set by the sender to give recipients a chance to receive the message and register their own more permanent interests if so desired. Of course, problems can arise if a recipient is on vacation for a period of time longer than the timeout. For this reason, voice files are archived before being deleted from the server.

For annotated documents in Cedar, the workstation software detects when a file is copied from the local disk to a public file server: it then calls RETAIN to register the appropriate "FileAnnotation" interests for the public file. Having workstation software automatically register interests as a file is copied to a file server works remarkably well. However, some important operations are not covered by this approach: renaming a file on a file server or copying files between two file servers. We see no way to detect such operations except by modifying file server software.

We have defined the "FileAnnotation" interest class such that its interest represents a publicly stored file name including the version number. With this scheme, interests must be reregistered for each new version of the file, that is, whenever a file is written to a public server. Unfortunately, the times that people want to annotate documents are precisely those times when the document is being updated often, so many interests are registered repeatedly. We rely on the garbage collector to get rid of old interests. An alternative would be to register a file without a version number, but that causes minor problems if voice is deleted from the file but the file itself remains in existence.

If we could obtain the cooperation of the file servers that store our documents, we could do a significantly better and less cumbersome job of managing interests. A collaborating file server could examine files for voice rope references and execute the necessary RETAIN and FORGET operations as the files were stored, copied, and deleted. This would reduce or eliminate the burden on application programs. We consider this a promising area for additional research.

5.5 Reliability

The voice file server, voice manager, and voice control server were implemented so that they could run on separate physical processors. That is, they all communicate among themselves and with voice clients using RPC. In practice, we run all three on the same Dorado. There is little to be gained by running them separately, since the voice file server cannot record or play voice files if the control server is down. Similarly, the voice manager cannot record or play voice ropes if the voice file server is down. Moreover, for all practical purposes, voice cannot be edited if the voice file server is down because users invariably need to listen to the voice passages that they are editing.

Thus, availability is not adversely affected by having the voice manager and file server co-located with the control server. If this server crashes or is otherwise unavailable, then no operations can be performed on stored voice. For the most part, this is simply an inconvenience to users in the same way that the unavailability of conventional file servers is an inconvenience. In Cedar, the file servers containing the important system files, fonts, and documentation are replicated to improve their availability. In our prototype, we have not found it necessary to pay the cost to provide a highly-available voice file server.

The one exception to this concerns voice interests. Clients often wish to register or deregister interests in voice ropes independently of playing the referenced voice. For example, an interest of type "FileAnnotation" is registered when a voice-annotated document is copied from a personal workstation to a public file server. A user should not be prevented from performing such a copy simply because the voice manager is unavailable. We have also observed that the interests for voice messages fail to get properly registered or deregistered if a person saves or deletes a voice message while the voice server is down. This has led us to contemplate writing a program that enumerates a person's mail database and checks that all voice messages have properly registered interests. The better solution is to make the voice interest database highly available, at least for updates. Rather than fully replicating the database, we have designed a mechanism whereby operations to RETAIN or FORGET a voice interest are logged locally by a user's workstation if the database server is unavailable: the operations in this log will be retried when the workstation detects that the voice manager has returned to operation.

5.6 Performance

The time performance of both the voice file server and the voice rope facilities easily meet the requirements of intended applications. Table 1 gives the measured performance of the various operations that can be performed on voice ropes. Measurements were obtained for both a simple voice rope that contains a single 5-second voice segment and a complex voice rope consisting of ten 5-second segments obtained from ten different voice files with different encryption keys. For these experiments, the client is a Dorado on a 3 MBit Ethernet while the server is a Dorado on a 1.5 MBit Ethernet: the client and server are separated by a single gateway. Times are given in milliseconds: for operations with significant variance in measured times across several experiments, a range of times is given with the average in parentheses.

The time given for a RECORD or PLAY operation is the period from the client initiation of the RPC call until the receipt by the client of a file server report that recording or playing has started. Clearly, the complete time for the operation depends on the length of the voice rope being recorded or played. This time can be easily computed given a voice transmission rate of 64 KBits/second.

| Operation | Time: simple | Time: complex |
|---|---|---|
| RECORD [†] | 264-390 (318) | — |
| PLAY [†] | 213-821 (394) | 450-617 (563) |
| CONCATENATE | 219-367 (279) | 878-1276 (1105) |
| SUBSTRING | 203-736 (373) | 239-608 (345) |
| REPLACE | 398-509 (444) | 683-1109 (937) |
| LENGTH | 33, 72 [‡] | 80 |
| DESCRIBE | 163 | 1432 |
| RETAIN | 285-881 (539) | = |
| FORGET | 290-763 (514) | 531-1024 (718) |
| LOOKUP | 33 | = |

[†] Time from beginning of RPC call to "started" report received by client.
[‡] For voice ropes whose length is not known by the database.
= Identical performance for simple and complex voice ropes.

Table 1. Performance of operations on simple and complex voice ropes (in milliseconds).

We were quite surprised by the large variance in the time observed for playing a voice rope. Further examination of the PLAY operation indicated where the time is spent, as depicted in Table 2. The variability is due to the time required to reliably distribute one or more encryption keys.

| Sub-operation | Time |
|---|---|
| Communication (RPC) overhead: | 18 |
| Database lookup and access control: | 18 |
| Distribution of encryption keys: | 137-745 |
| Schedule playback with voice file server: | 4 |
| Time to receipt of "started" report: | 36 |
| TOTAL | 213-821 |

Table 2. Breakdown of time spent in the PLAY operation for simple voice rope.

As expected, the cost of the DESCRIBE operation increases almost linearly with the length of the voice rope. For most of the other operations, the time depends heavily on the cost of database updates rather than the size or complexity of the voice rope involved. However, the complexity of a voice rope has an indirect effect on the cost of writing that voice rope to the database. The database system maintains a B-Tree index that keeps track of all voice ropes containing part of a given voice file. Thus, when adding a voice rope to the database, an update to this index is required for each segment of the voice rope. This explains why operations such as CONCATENATE and REPLACE are significantly more expensive for complex voice ropes.

We do not have current measurements of the server load during RECORD or PLAY. However, early experience with the voice file server indicated that it can handle about eight simultaneous connections [22].

During the development of the voice manager, we have exercised the garbage collection routines and have verified that they properly identify the objects to delete, but we have not actually allowed them to delete anything. Because of this, there are quite a large number of voice ropes, voice files, and interests in existence. Even so, recent measurements indicate that the interest verifier makes a complete pass through the interest database in 13 seconds. The voice rope garbage collector, runs in 140 seconds, or approximately 80 ms. per voice rope. Thus, the entire garbage collection suite for a database of this magnitude can be executed in just a few minutes. Running the garbage collectors once per night, we could support a considerably larger population of voice ropes and interests than we currently exist.

This paper has been concerned with the editing and management of recorded voice, dealing with operations whose performances must be compatible with human response times: sub-second response at a peak rate of several operations per second is more than adequate. The measurements reported herein confirm that the voice manager meets these requirements. Moreover, since network communication time is not a significant factor in the timings reported, the voice rope facilities would work in a substantially more extensive and heterogeneous network environment than we have tried to date.

6. Related work

Several companies provide speech message systems that can be accessed from standard telephones: one of the earliest examples of this type of system was IBM's experimental Speech Filing System, which was operational in 1975 [9]. Certainly the Etherphone system's facilities can be accessed from telephones, but that was not the driving application. We were interested in allowing voice to be integrated easily into a user's existing means of digital communications, rather than forcing users to learn a completely new system. The Sydis Information Manager provides workstation control over the recording, editing, and playing of voice as in the Etherphone system, but requires special workstations called VoiceStations [17]. Ruiz also developed a prototype voice system that integrates voice and data into some simple workstation applications; however, he did not address the important issues of sharing stored voice [19].

Maxemchuk's speech storage system [14] provided many of the same facilities for recording, editing, and playing voice as our voice file server. (Actually, he provided much more control over the playing of voice than we do, such as the ability to vary playback speeds or adjust silence intervals.) The division of function between a main computer and a storage computer is also quite similar to the separation between our voice manager and voice file server. However, Maxemchuk's system edits voice using divide and join operations that modify the control sectors of stored voice messages. Our technique of building data structures that reference voice files better supports sharing by making voice ropes immutable and simplifies the requirements placed on the voice file server. For instance, our techniques are very amenable to write-once storage technologies such as optical disks.

Version Storage in the Swallow system [20] has many similar characteristics to our voice manager. That is, it manages immutable objects of various sizes. Also, its "structured version images" used for large objects are similar to the data structures used by the voice file server to describe voice files. Unlike the voice manager, Swallow provides no editing mechanisms or garbage collection, just read and write operations. It does, however, maintain histories to link together objects that are derived from one another and supports atomic operations on multiple objects.

The Diamond Document Store [25], like the Etherphone system, manages documents that contain various media elements by reference; it also allows documents to be shared among users by reference. Because the Diamond system does not allow documents stored outside the system to reference internally stored objects, a simple reference count mechanism suffices for deallocating objects that reside in the Document Store but are not referenced by any document or document folder. The Etherphone system, on the other hand, strives to provide voice services that can be used along with other existing services, such as the Grapevine mail system [3] and Alpine file servers [6].

The Cambridge File Server [15] was perhaps the first network-accessible storage system to require clients to take an explicit action to prevent files from being automatically garbage collected. In particular, it deletes files that are not accessible from server-maintained, but client-updated "indices". Thus, these indices play much the same role as the voice manager's interest database.

Several methods for distributed garbage collection have been documented in the literature. For example, Liskov and Ladin have a scheme in which all sites that store references to other objects run a garbage collector locally and send information about non-local references to a *reference server* [13]. In some sense, their use of a reference server is similar to our use of registered interests, but much more limited. One interesting contribution they make is how to build a highly-available reference server; we could use these techniques to build an interest server.

7. Conclusions

The facilities for managing stored voice in the Etherphone system were designed with the intent of moving voice data as little as possible. Once recorded in the voice file server, voice is never copied until a workstation sends a play request; at this point the voice is transmitted directly to an Etherphone. In particular, although workstations initiate most of the operations in the Etherphone system, there is little reason for them to receive the actual voice data since they have no way of playing it.

Maintaining voice on a publicly accessible server, the voice manager, facilitates sharing among various clients. Clients can freely share references to voice ropes without incurring the overhead of transmitting the voice itself. Because voice ropes are immutable, even though they are incorporated into documents by reference, they exhibit copy semantics.

To support efficient editing, a two level storage hierarchy is employed: voice ropes refer to intervals of voice files. A given voice rope can consist of intervals from several voice files, and a given voice file can be used by several voice ropes. A database stores the many-to-many relationships that exist between voice ropes and files. Editing operations simply create new voice ropes from old ones and add them to the database.

The editing operations provided by the voice manager are similar to those in the Cedar Rope package. This is intentional so that programmers can manipulate voice in the ways to which they are accustomed to dealing with text. The basic facilities to support editing reside on a server. Workstations are responsible for providing a user interface that is integrated with their programming environment.

Several aspects of the voice manager were designed to accommodate the heterogeneous nature of our environment. Providing a single implementation of the voice rope facilities on a server obviates the need for each different workstation programming environment to provide its own implementation. Moreover, the only requirements placed on a workstation in order to make use of the voice services are that it have an associated Etherphone and an RPC implementation. In particular, workstations need not have direct hardware support for encryption or voice I/O.

The voice manager reduces the work generally associated with building voice applications by providing a convenient set of application-independent abstractions for stored voice. It makes no assumptions about the way clients make use of its services. This particularly impacted the design of the voice garbage collector.

Automatic reclamation of the storage occupied by unneeded voice ropes is done using a modified type of reference counting. Clients register interests in particular voice ropes. These interests are grouped into classes and can be invalidated according to a class-specific algorithm. For the most part, users of voice applications are not aware of how or when interests are registered since the application software handles this transparently.

The Etherphone system uses secure RPC for all control functions and DES encryption for transmitted voice. These ensure the privacy of voice communication, which is important even in a research environment, although the Ethernet is inherently vulnerable to interception of information. Storing the voice in its encrypted form protects the voice on the server and also means that the voice need not be reencrypted when played. All in all, the voice system actually provides better security than most conventional file servers.

The Etherphone system has provided an environment in which to explore the management of voluminous, shared data among distributed and heterogeneous workstation clients. One could argue that compression of digitally recorded utterances would eliminate the need for special treatment in our current voice applications. However, even with compression, there is a performance penalty in manipulating such large objects. More importantly, high-resolution scanned images and real-time digital video recordings will continue to be voluminous. We believe that the techniques presented in this paper are applicable to and beneficial for the management of these media as well as to voice.

Acknowledgments

The design of voice ropes evolved for several years and many people contributed valuable suggestions, including Polle Zellweger, Stephen Ades, Luis Felipe Cabrera, and Larry Stewart. John Ousterhout designed and implemented the voice file server. Lia Adams built an early version of the voice mail system. Michael Schroeder suggested the use of interests for garbage collection of voice messages. Stephen Ades' implementation of a voice editor allowed us to get some experience with voice ropes. Severo Ornstein, Larry Stewart, and Dan Swinehart started the Etherphone project in 1982 and designed the Etherphone equipment. We are grateful to the many Cedar implementors who provided a wonderful environment for the Etherphone system.

Margaret Butler, Alan Demers, Bob Hagmann, Jack Kent, Guy Steele, Polle Zeilweger, and many anonymous reviewers, contributed insightful suggestions, comments, and corrections. Subhana Menis, Bridget Scamporrino, Polle Zeilweger, and Rick Beach provided invaluable assistance with the composition and printing.

References

1. Ades, S., and Swinehart, D. C. Voice annotation and editing in a workstation environment. In *Proceedings AVIOS Voice Applications '86*, 13-28. September 1986.
2. Bayer, R., and McCreight, E. Organization and maintenance of large ordered indexes. *Acta Informatica* 1(3):173-189, 1972.
3. Birrell, A., Levin, R., Needham, R. M., and Schroeder, M. D. Grapevine: An exercise in distributed computing. *Communications of the ACM* 25(4):260-274, April 1982.
4. Birrell, A. D., and Nelson, B. J. Implementing remote procedure calls. *ACM Transactions on Computer Systems* 2(1):39-59. February 1984.
5. Birrell, A. D. Secure communication using remote procedure calls. *ACM Transactions on Computer Systems* 3(1):1-14, February 1985.
6. Brown, M. R., Kolling, K., and Taft, E. A. The Alpine file system. *ACM Transactions on Computer Systems* 3(4):261-293, November 1985.
7. Clark, D. D. The structuring of systems using upcalls. *Proceedings Tenth Symposium on Operating Systems Principles*, Orcas Island, Washington, 171-180, December 1985.
8. Donahue, J., and Orr, W.-S. Walnut: Storing electronic mail in a database. Xerox Palo Alto Research Center. Technical Report CSL-85-9, November 1985.
9. Gould, J. D., and Boies, S. J. Speech filing—An office system for principles. *IBM Systems Journal* 23(1):65-81, January 1984.
10. Gray, J. N. Notes on database operating systems. In Bayer *et al.*, *Operating Systems: An Advanced Course*. Springer-Verlag, 393-481, 1978.
11. Lampson, B. W. and Pier, K. A. A processor for a high-performance personal computer. *Proceedings 7th Symposium on Computer Architecture*, La Baule, 146-160, May 1980.
12. Lampson, B. W. Hints for computer system design. *Proceedings Ninth Symposium on Operating Systems Principles*, Bretton Woods, New Hampshire, 33-48, October 1983.
13. Liskov, B., and Ladin, R. Highly-available distributed services and fault-tolerant distributed garbage collection. *Proceedings of Symposium on Principles of Distributed Computing*, Calgary, Alberta, Canada, 29-39, August 1986.
14. Maxemchuk, N. An experimental speech storage and editing facility. *Bell System Technical Journal* 59(8):October 1980, 1383-1395.
15. Mitchell, J. G., and Dion, J. A comparison of two network-based file servers. *Communications of the ACM* 25(4):233-245, April 1982.
16. National Bureau of Standards. *Data Encryption Standard*. Federal Information Processing Standard (FIPS) Publication 46, U. S. Department of Commerce, January 1977.
17. Nicholson, R. Integrating voice in the office world. *BYTE* 8(12):177-184, December 1983.
18. Reynolds, J. K., Postel, J. B., Katz, A. R., Finn, G. G., and DeSchon, A. L. The DARPA experimental multimedia mail system. *Computer* 18(10):82-89, October 1985.
19. Ruiz, A. Voice and telephony applications for the office workstation. *Proceedings 1st International Conference on Computer Workstations*, San Jose, CA, 158-163, November 1985.
20. Svobodova, L. A reliable object-oriented data repository for a distributed computer system. *Proceedings Eighth Symposium on Operating Systems Principles*, Pacific Grove, California, 47-58, December 1981.
21. Svobodova, L. File servers for network-based distributed systems. *ACM Computing Surveys* 16(4):353-398, December 1984.
22. Swinehart, D. C., Stewart, L. C., and Ornstein, S. M. Adding voice to an office computer network. *Proceedings IEEE GlobeCom '83*, November 1983. Also available as Xerox Palo Alto Research Center Technical Report CSL-83-8, February 1984.
23. Swinehart, D. C., Zellweger, P. T., Beach, R. J., and Hagmann, R. B. A structural view of the Cedar programming environment. *ACM Transactions on Programming Languages and Systems* 8(4):419-490, October 1986. Also available as Xerox Palo Alto Research Center Technical Report CSL-86-1, June 1986.
24. Swinehart, D. C., Terry, D. B., and Zellweger, P. T. An experimental environment for voice system development. *IEEE Office Knowledge Engineering Newsletter*, February 1987.
25. Thomas, R. H., Forsdick, H. C., Crowley, T. R., Schaaf, R. W., Tomlinsin, R. S., Travers, V. M., and Robertson, G. G. Diamond: A multimedia message system built on a distributed architecture. *Computer* 18(12):65-78, December 1985.
26. Yankelovich, N., Meyrowitz, N., and van Dam, A. Reading and writing the electronic book. *Computer* 18(10):15-30, October 1985.

What is claimed:

1. In a hypermedia distributed computing system including a communications medium, a plurality of workstations coupled to said communications medium for enabling users to transfer digital textual data back and forth between said workstations, a file server coupled to said communications medium for storing digital non-textual data files representing human perceivable information, transducer means proximate certain of said workstations, said transducer means being coupled to said communications medium for enabling users to record uniquely named non-textual data files on said file server and to playback such files subject to access authorization, and management means coupled to said communication medium and to said file server, said management means including a database system including a database of uniquely named reference entries referring by file name and time interval to said non-textual data files, whereby users may be given selective access to selected ones and selected parts of selected ones of said non-textual data files by embedding the reference entry names corresponding thereto in textual data distributed to selected users via said communication medium;

the improvement comprising a database of user registered interest entries in said database system, with each of said interest entries identifying the reference entry to which it pertains, the user responsible for registering said interest entry, and a unique user assigned reference value, means coupled to said database of user registered interest entries for periodically enumerating all of the registered interest entries and for deleting any interest entries found to be no longer valid, means coupled to said database of reference entries for periodically enumerating said reference entries and for deleting any reference entries of more than minimum age that have no interests referring to them, and means coupled to said file server for deleting from said file server any non-textual files that have no references referring to them, thereby reclaiming storage space occupied by obsolete files.

* * * * *